(12) United States Patent
Luo et al.

(10) Patent No.: US 10,078,621 B2
(45) Date of Patent: Sep. 18, 2018

(54) METHOD, APPARATUS, AND SYSTEM FOR DISPLAYING ORDER INFORMATION

(71) Applicant: Alibaba Group Holding Limited, George Town (KY)

(72) Inventors: Yunguang Luo, Hangzhou (CN); Long Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 90 days.

(21) Appl. No.: 14/621,143

(22) Filed: Feb. 12, 2015

(65) Prior Publication Data
US 2015/0234791 A1    Aug. 20, 2015

(30) Foreign Application Priority Data

Feb. 17, 2014  (CN) .......................... 2014 1 0053305

(51) Int. Cl.
*G06F 17/00*  (2006.01)
*G06F 17/21*  (2006.01)
*G06F 17/30*  (2006.01)

(52) U.S. Cl.
CPC ...... *G06F 17/212* (2013.01); *G06F 17/30864* (2013.01)

(58) Field of Classification Search
CPC .......................... G06F 17/212; G06F 17/30864
See application file for complete search history.

(56) References Cited

U.S. PATENT DOCUMENTS

| | | | |
|---|---|---|---|
| 6,912,505 B2 | 6/2005 | Linden et al. | |
| 6,920,606 B1 * | 7/2005 | Jablonski | G06Q 30/02 345/619 |
| 7,584,159 B1 | 9/2009 | Chakrabarti et al. | |
| 7,614,547 B2 | 11/2009 | Kotas et al. | |
| 7,685,074 B2 | 3/2010 | Linden et al. | |
| 8,522,148 B1 * | 8/2013 | Pry | G06F 17/30864 715/745 |
| 8,977,984 B2 * | 3/2015 | Shimazu | G06F 3/0482 455/566 |
| 9,286,390 B2 * | 3/2016 | Marantz | G06F 17/30864 |
| 9,679,332 B2 * | 6/2017 | Kim | G06Q 30/0643 |
| 2002/0161664 A1 | 10/2002 | Shaya et al. | |

(Continued)

FOREIGN PATENT DOCUMENTS

| | | |
|---|---|---|
| CN | 102004979 | 4/2011 |
| JP | 2002175464 | 6/2002 |

(Continued)

OTHER PUBLICATIONS

Hongxia Li, "Study on Online Shop Brand Building", Master's Thesis, Shangdong University, Apr. 9, 2009, p. 118.

*Primary Examiner* — Laurie A Ries
(74) *Attorney, Agent, or Firm* — Van Pelt, Yi & James LLP

(57) ABSTRACT

Embodiments of the present application relate to a method and system for displaying images in a background display area of a target page. The method includes receiving a request to display a target page, wherein the target page includes a background display area and a foreground display area, determining a target image, wherein the target image includes image information associated with a product object in at least part of the order history records of the current user, and causing the target image to be displayed in the background display area.

23 Claims, 17 Drawing Sheets

(56) References Cited

U.S. PATENT DOCUMENTS

| | | | |
|---|---|---|---|
| 2004/0140975 A1* | 7/2004 | Saito | G07F 17/0014 345/418 |
| 2005/0139662 A1* | 6/2005 | Eglen | G06O 30/06 235/383 |
| 2005/0240580 A1 | 10/2005 | Zamir et al. | |
| 2005/0273376 A1 | 12/2005 | Ouimet et al. | |
| 2007/0005481 A1* | 1/2007 | Kedia | G06Q 40/04 705/37 |
| 2007/0150361 A1 | 6/2007 | Kreiner et al. | |
| 2007/0276688 A1 | 11/2007 | Sun et al. | |
| 2008/0147493 A1* | 6/2008 | Aarnio | G06Q 30/02 705/14.64 |
| 2008/0215349 A1 | 9/2008 | Baran et al. | |
| 2008/0242277 A1* | 10/2008 | Chen | G06Q 10/10 455/414.2 |
| 2009/0171754 A1 | 7/2009 | Kane et al. | |
| 2009/0172021 A1 | 7/2009 | Kane et al. | |
| 2009/0292605 A1 | 11/2009 | Kniaz et al. | |
| 2010/0100542 A1* | 4/2010 | Hawthorne | G06F 17/30867 707/732 |
| 2010/0100848 A1* | 4/2010 | Ananian | G06F 3/0482 715/834 |
| 2010/0114654 A1 | 5/2010 | Lukose et al. | |
| 2010/0191619 A1 | 7/2010 | Dicker et al. | |
| 2010/0268661 A1 | 10/2010 | Levy et al. | |
| 2010/0325135 A1* | 12/2010 | Chen | G06F 17/30053 707/759 |
| 2011/0113028 A1 | 5/2011 | Staddon | |
| 2011/0191160 A1* | 8/2011 | Blackhurst | G06Q 20/20 705/14.38 |
| 2011/0313989 A1* | 12/2011 | Ghosh | G06F 17/30728 707/706 |
| 2011/0314502 A1* | 12/2011 | Levy | H04N 7/106 725/46 |
| 2012/0109368 A1* | 5/2012 | Canter | G06Q 30/0237 700/233 |
| 2012/0117451 A1* | 5/2012 | You | G06F 17/30899 715/205 |
| 2012/0120110 A1* | 5/2012 | Chae | G06T 11/00 345/660 |
| 2012/0310731 A1 | 12/2012 | Li et al. | |
| 2012/0310773 A1* | 12/2012 | Masuko | G06Q 30/00 705/26.8 |
| 2013/0024282 A1 | 1/2013 | Kansal et al. | |
| 2013/0060843 A1* | 3/2013 | Yamahara | G06Q 10/10 709/203 |
| 2013/0215116 A1* | 8/2013 | Siddique | G06Q 30/0643 345/420 |
| 2013/0257877 A1* | 10/2013 | Davis | A63F 13/12 345/473 |
| 2013/0275418 A1* | 10/2013 | Kumar, V | G06F 17/30277 707/723 |
| 2014/0089142 A1 | 3/2014 | Jackovin | |
| 2014/0197234 A1* | 7/2014 | Hammad | G06Q 30/06 235/379 |
| 2014/0278998 A1 | 9/2014 | Systrom et al. | |
| 2015/0193390 A1* | 7/2015 | Stekkelpak | G06F 17/30882 715/207 |
| 2015/0199708 A1* | 7/2015 | Ying | G06Q 30/0241 705/14.4 |

FOREIGN PATENT DOCUMENTS

| | | |
|---|---|---|
| JP | 2002252752 | 9/2002 |
| JP | 2003190623 | 7/2003 |
| JP | 2008282098 | 11/2008 |
| JP | 2009210887 | 9/2009 |
| JP | 2010224945 | 10/2010 |
| JP | 2013140265 | 7/2013 |
| JP | 2013206144 | 10/2013 |
| WO | 2007134125 | 11/2007 |
| WO | 2009086014 | 7/2009 |
| WO | WO2012094519 | 7/2012 |
| WO | 2012167033 | 12/2012 |

* cited by examiner

METHOD, APPARATUS, AND SYSTEM FOR DISPLAYING ORDER INFORMATION

CROSS REFERENCE TO OTHER APPLICATIONS

This application claims priority to People's Republic of China Patent Application No. 201410053305.9 entitled A METHOD AND A DEVICE FOR DISPLAYING ORDER INFORMATION IN A BACKGROUND DISPLAY AREA, filed Feb. 17, 2014 which is incorporated herein by reference for all purposes.

FIELD OF THE INVENTION

The present application relates to a method, an apparatus, and a system for displaying order information in a background display area.

BACKGROUND OF THE INVENTION

As mobile Internet technology undergoes rapid development, and smart mobile terminal devices become widespread, an increasing number of applications (abbreviated as "apps") has been developed for mobile terminals. Apps introduced for e-commerce platforms are among the most commonly installed and used apps. These apps enable users to browse products, conduct online transactions, and perform other such operations using mobile phones or other mobile devices. Apps have made shopping much easier for users.

However, further improvement of the utility of a particular app is needed if a particular app could provide users with convenience in areas other than core functions thereof such as product browsing and online transactions. An improvement in the utility of the particular app in turn would further increase the installation and use rates of the app. For example, an app could provide a user with an order record of already purchased products. Such information would help the user to check on which orders have already been generated, the status of each order, and the like.

Some existing apps may provide users with an order record. Users are typically required to launch such functionality through a specific entrance (e.g., a button in the main interface). In response to selection of the specific entrance, the app according to the related art displays the user's order record on a page. The order record displayed by the app according to the related art generally is presented in the form of a list that includes the name, the price, the order issue date and time, and the order status of the product objects corresponding to each order. In addition, existing apps typically allow a user to click any item within the list to view order details specific thereto.

However, in such an approach to viewing order records, the records are displayed to the user only when the user launches such functionality through a specific entrance. In other words, the user will have to execute at least one operation such as clicking if the user wants to acquire the information. In addition, if a traditional listing or other such approach is employed on a mobile terminal, which is characterized by a relatively small screen, then less overall information is displayed as a result of the relatively small screen of the mobile terminal. Viewing of the order information will thus be adversely affected.

BRIEF DESCRIPTION OF THE DRAWINGS

Various embodiments of the invention are disclosed in the following detailed description and the accompanying drawings.

In order to provide a clearer explanation of the technical solutions in the prior art or in embodiments of the present application, simple introductions are given below to the drawings which are needed for the embodiments. Obviously, the drawings described below are merely some embodiments of the present application. Persons with ordinary skill in the art could, without expending creative effort, obtain other drawings on the basis of these drawings.

DETAILED DESCRIPTION

Figure 1:
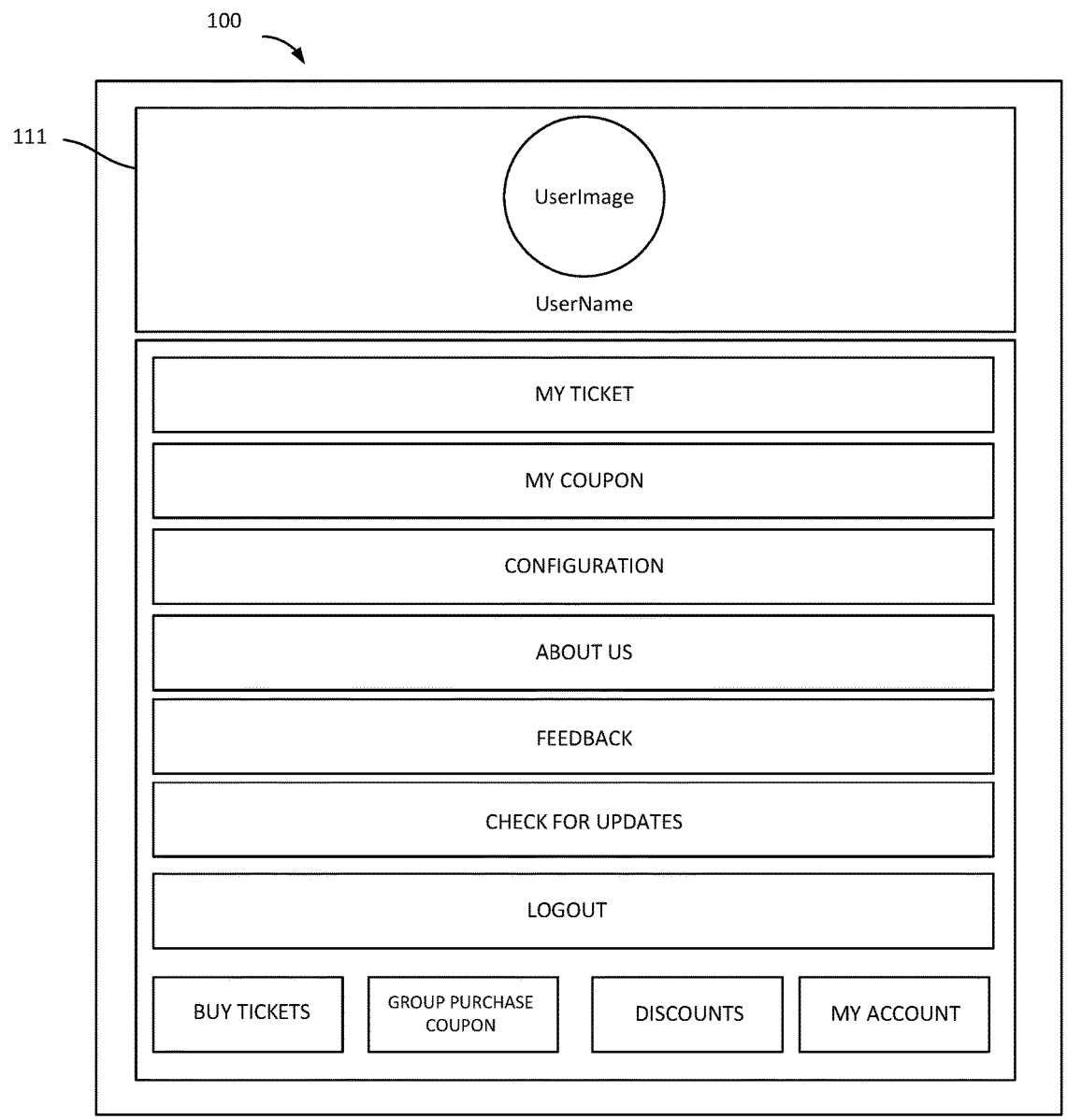
FIG. 1 is an illustration of a personal home page of an application according to various embodiments of the present disclosure.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of the present disclosure include a method, an apparatus, and a system for displaying order information.

A terminal generally refers to a device used (e.g., by a user) within a network system and used to communicate with one or more servers. According to various embodiments of the present disclosure, a terminal may include communication functionality. For example, a terminal may be a smart phone, a tablet Personal Computer (PC), a mobile phone, a video phone, an e-book reader, a desktop PC, a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a terminal includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a terminal can be any combination of the foregoing devices. In addition, it will be apparent to one having ordinary skill in the art that a terminal according to various embodiments of the present disclosure is not limited to the foregoing devices.

FIG. 1 is an illustration of a personal home page of an application according to various embodiments of the present disclosure.

Referring to FIG. 1, a personal home page 100 is provided. In some embodiments, the personal home page 100 is configured or displayed by a device such as a device 1000 illustrated in FIG. 10, a device 1100 illustrated in FIG. 11, or the like. In some embodiments, the personal home page 100 is configured or displayed by a method 200 illustrated in FIG. 2A, a method 750 illustrated in FIG. 7B, or a method 850 illustrated in FIG. 8B. In some embodiments, the personal home page 100 is configured by a server such as server 920 illustrated in FIG. 9.

As illustrated in FIG. 1, an app page typically has a background display area 111. According to some related art, a user can configure the app page according to user preferences, user settings, the like, or a combination thereof. For example, the user can configure the app page (e.g., the background display area 111) to include one or more images (e.g., a profile image such as a photograph of the user) according to the user's preferences. According to some related art, if the user has not configured the app page (or a user's profile associated with the app page), then the app page typically displays a default image. According to some related art, the background display area 111 of the app page is provided in order to allow a personalization of the appearance of the interface.

In contrast, various embodiments of the present disclosure provide a background display area 111 of an app page that provides greater utility. An app page can display a background display area 111 and a foreground display area. The foreground display area can be displayed emphatically in relation to the background display area 111. The foreground display area may include one or more elements that are displayed so as to be overlaid on the background display area 111. The one or more elements displayed on the foreground display area can be displayed so as to be translucent. The background display area can be displayed so as to be shaded in relation to the foreground display area. For example, the display space constituted by the background display area 111 of the app page can be fully utilized in relation to functionality and information presented therein. In some embodiments, information relating to order records can be displayed within this background display area 111. As a result, the background display area 111 of the app page can provide an order information display function. In some embodiments, the configuration of the background display area 111 of the app page to provide order information enables users to view information relating to order history records without having to enter a specific order history record page (e.g., by selecting a button on an interface page). Therefore, the providing of order information using the background display area 111 (e.g., by displaying the order information in the background display area 111) of the app page can shorten the operating path whereby a user acquires order history records, can provide a personalized target page, can display information that is likely to be relevant to a current user, and conserve computing resources.

Figure 2A:
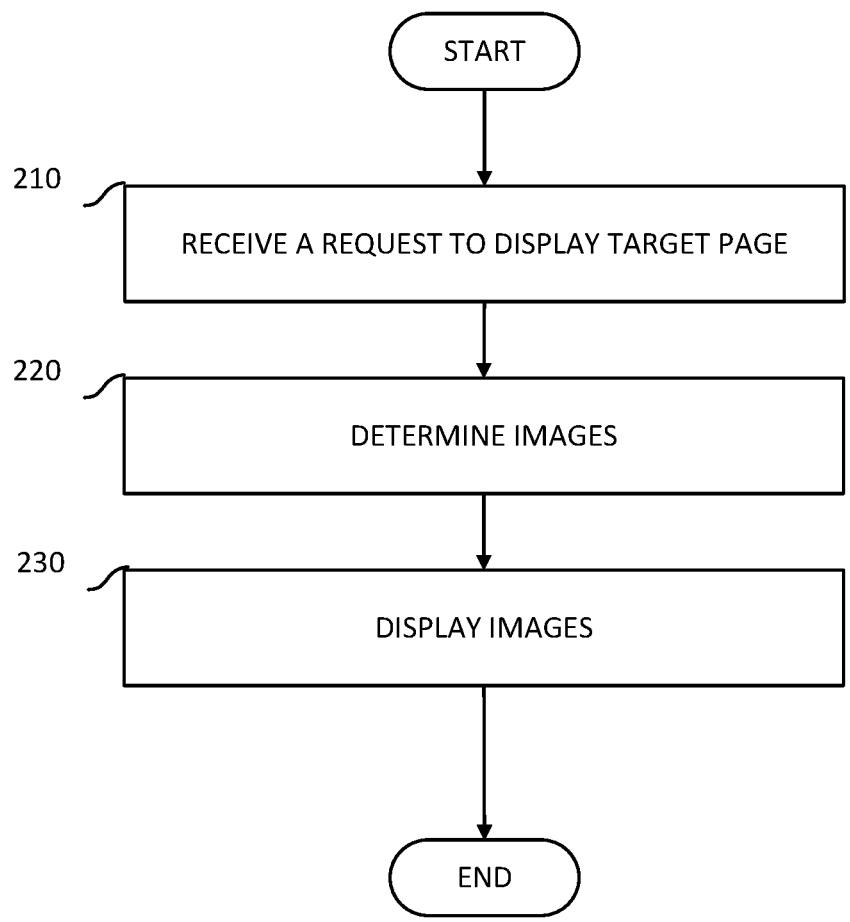
FIG. 2A is a flowchart of a method for displaying order information according to various embodiments of the present disclosure.

FIG. 2A is a flowchart of a method for displaying order information according to various embodiments of the present disclosure.

Referring to FIG. 2A, a method 200 for displaying order information is provided. In some embodiments, the method 200 is implemented by a system 900 illustrated in FIG. 9. In some embodiments, the method 200 is implemented by device 1000 illustrated in FIG. 10. In some embodiments, the method 200 is implemented by device 1100 illustrated in FIG. 11. In some embodiments, the method 200 is implemented by device 1200 illustrated in FIG. 12.

At 210, a request to display a target page is received. According to various embodiments of the present disclosure, a terminal receives a request to display a target page. As an example, the request to display the target page is generated in response to a user input (e.g., a user selection). As another example, the request to display the target page is generated by an application in response to a preset event. In some embodiments, the preset event can be receipt of a communication, receipt of a notification of a contextual event, the like, or any combination thereof. In some embodiments, the target page (also referred to as the app target page) includes a background display area (e.g., the background display area 111 of the app page illustrated in FIG. 1). In response to the preset event, some or all images corresponding to purchases of a user can be acquired.

In some embodiments, after a user installs an app on the user's mobile terminal device and logs in to the app, the app will record the user's login information (e.g., account name, password, the like, or a combination thereof) locally on the mobile terminal device. Thereafter, in response to the app being activated, the app directly uses the locally recorded user login information. For example, the app can use the locally recorded user login information to log in to the app (e.g., to a server providing service to the app) and enter (e.g., gain access to) the personal home page.

In specific embodiments, the request to display the app target page may be received when the app is activated. For example, the terminal may receive the request to display the app target page when (e.g., in response to) the app is activated. In some embodiments, the terminal sends a request for information associated with the app target page (e.g., information to be displayed in relation to the target page) in response to the terminal receiving the request to display the app target page. For example, the terminal can send a request for one or more target images to display on the app target page. In some embodiments, when the user activates the app (e.g., by selecting an icon associated with the app on the mobile terminal device desktop, or the like), the app can receive a request to display a personal home page. Thereafter, the app can perform a login based on the locally saved login information. For example, in some embodiments, the app retrieves the locally saved login information and sends the retrieved login information to a server in connection with the login. In some embodiments, the information sent back by the server (e.g., user configuration information in response to a successful login of the terminal to the server, or the like) is used as a basis for displaying the personal home page of the current user (e.g., a user associated with the locally saved login information retrieved by the app and used in connection with the login, or the like).

In some embodiments, the user can enter the various sub-pages of the app after the app is activated and use one or more of the features corresponding thereto. For example, FIG. 1 illustrates a personal homepage. In some embodiments, the personal homepage includes one or more links, buttons, or the like respectively associated with one or more corresponding functions, various subpages of the app, or the like. In some embodiments, the one or more links, buttons, or the like includes one or more of "Buy Tickets," "Discount," "My Movie Tickets," "Settings," and other feature option points of entry. In addition, in some embodiments, the personal homepage includes one or more specific business interface points of entry such as "Select Seat and Purchase Ticket" or "Group Purchase Coupon." In some embodiments, these points of entry can be selected (e.g., by a user) to perform settings, view information, realize specific business services, the like, or a combination thereof.

In some embodiments, a return to the personal homepage may be desired. For example, after the user enters (e.g., accesses) a certain sub-page (e.g., through selection of a point of entry), the user may need to return to the personal homepage. At this point, the user may use the "Back," "Return," or other such button to issue a request to display the personal homepage. In some embodiments, a request to display the personal homepage (e.g., if the user uses the "Back," "Return," or other such button to issue a request to display the personal homepage) corresponds to the request that is received at 210.

Various embodiments of the present technique are not limited to movie ticket purchases and other such applications. For example, various embodiments of the present application also extend to various applications related to product objects (e.g., application clients corresponding to various types of products). An example of an application related to product objects would be an application designed for group purchasing (e.g., applications for which the corresponding type of product object is the group purchasing product type). Other examples of an application related to product objects include applications for purchasing digital products, apparel, appliances, food, other different product categories, or any combination thereof.

At 220, one or more target images are determined. In some embodiments, the one or more target images include image information of product objects. In some embodiments, the one or more target images include image information of product objects in at least part of the order history records of a user (e.g., the current user). In some embodiments, the one or more target images include less than or equal to 100 target images. For example, in the event that greater than 100 product objects (e.g., associated with the order history records of a user) exists, then target images for a subset of all the product objects are determined. For example, if the number of product objects is greater than 100, the one or more target images of the product objects corresponding to the most recent (e.g., latest) orders of the user are determined.

After receiving the request to display the app target page, a target image may be determined. In some embodiments, a terminal may determine one or more target images. In some embodiments, the terminal that determines the one or more target images corresponds to a terminal used by the user (e.g., the current user). In some embodiments, the terminal that determines the one or more target images corresponds to a server (e.g., a web server) with which a terminal used by the user (e.g., the current user) communicates.

In some embodiments, the one or more target images may be determined in response to receiving the request to display the app target page. In some embodiments, the one or more target images can be generated (e.g., determined) using the product object image information associated with the user (e.g., the user's order history, the user's browsing history, the user's preferences, the user's settings, the like, or any combination thereof). As an example, the one or more target images can be determined using the product object image information in part or all of the order history records of the user (e.g., the current user) by selecting the product object image associated with the last product that was browsed or purchased by the user, the product that was most frequently purchased by the user, or any other appropriate techniques.

In some embodiments, with regard to displaying the one or more target images on the background display area on the app page, the target images may be generated after receiving the request to display the target page (e.g., from the user). In some embodiments, the target images may be generated in advance (e.g., before receiving the request to display the target page).

The one or more target images are displayed in the background display area of the target page. In some embodiments, the one or more target images are displayed directly in the background display area of the target page. As an example, the one or more target images are displayed directly in the background display area of the target page after the request to display the target page is received (e.g., from the user). In some embodiments, the one or more target images are displayed directly in the background display area of the target page in response to receiving the request to display the target page.

Figure 2B:
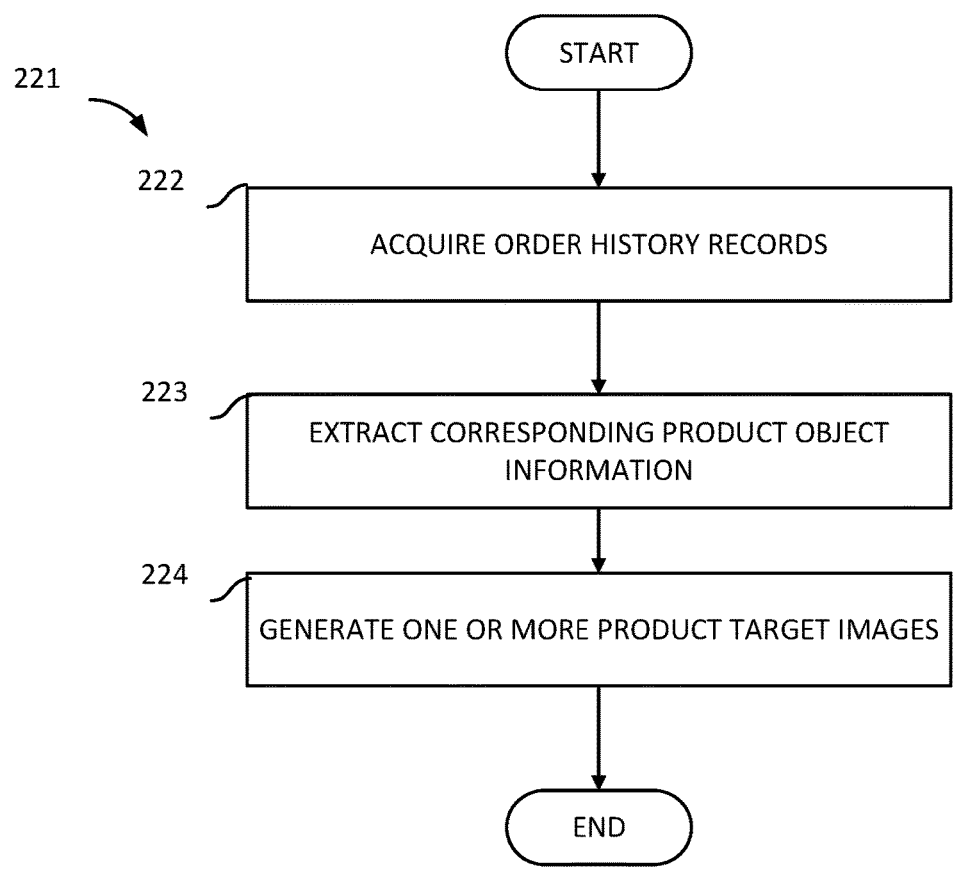
FIG. 2B is a flowchart of a method for determining a product image according to various embodiments of the present disclosure.

FIG. 2B is a flowchart of a method for determining a product image according to various embodiments of the present disclosure.

Referring to FIG. 2B, a method 221 for displaying order information is provided. In some embodiments, the method 221 is used to determine product images at 220 illustrated in FIG. 2A. In some embodiments, the method 221 is implemented by a system 900 illustrated in FIG. 9. In some embodiments, the method 221 is implemented by device 1000 illustrated in FIG. 10. In some embodiments, the method 221 is implemented by device 1100 illustrated in FIG. 11. In some embodiments, the method 221 is implemented by device 1200 illustrated in FIG. 12.

At 222, order history records are acquired. In some embodiments, information regarding the order history of the user is acquired. In some embodiments, the order history records are acquired by a terminal used by the user (e.g., a client terminal). The order history records can be acquired from a server. In some embodiments, the order history records are acquired by a server (e.g., a server with which a terminal used by the user communicates).

At 223, corresponding product object information is extracted. In some embodiments, the extracting of the corresponding product object image information from the user's order history information comprises extracting the corresponding product object image information from each record of the user's order history records. In some embodiments, the product object information is extracted by a terminal used by the user (e.g., a client terminal). In some embodiments, the product order information is extracted by a server (e.g., a server with which a terminal used by the user communicates).

At 224, one or more target images are generated. In some embodiments, the one or more target images are generated based at least in part on the extracted product object image information for each corresponding product object. In some embodiments, the one or more target images are generated by a terminal used by the user (e.g., a client terminal). In some embodiments, the one or more target images are generated by a server (e.g., a server with which a terminal used by the user communicates). In some embodiments, the one or more target images are generated by referring to one or more product images (e.g., using an identifier, pointer, or the like). In some embodiments, the one or more target images are generated by generating an arrangement of existing images corresponding to one or more product images. In some embodiments, a list of target image identifiers or some other reference to a specific set of one or more product images is generated. In some embodiments, images corresponding to the one or more target images exist in a database or storage system, and the generation of the one or more target images includes acquiring, retrieving, or otherwise referencing the corresponding images stored in the database or storage system.

In some embodiments, regardless of whether the one or more target images are generated (e.g., determined) after the request to display the target page is received or are generated in advance, and regardless of whether the one or more target images are generated by a client or a server, generation of the target images comprises (i) acquiring information regarding the order history of the user (e.g., the order history records of the current user), (ii) extracting corresponding product object image information from the user's order history information, and (iii) generating the one or more target images based at least in part on the extracted product object image information for each corresponding product object.

The product object image information can be extracted from the order history information after the order history information is requested and received. In some embodiments, images of corresponding product objects associated with the order history information can be saved on one or more of the terminal, the server, the like, or any combination thereof. For example, if the corresponding product object associated with an order is a piece of apparel, then an image of the piece of apparel can be saved within the corresponding order information. The image of the piece of apparel can be extracted from the corresponding order information.

If the one or more target images are to be generated by the client (e.g., a terminal used by the user), the client may, at 222, acquire the user's (e.g., the current user's) order history records from a server. In some embodiments, the client acquires the user's order history records after receiving (e.g., by the app) the request to display the target page. In some embodiments, the client acquires the user's order history records in advance of the client receiving (e.g., by the app) the request to display the target page. In some embodiments, the client performs 223 and 224 after acquiring the user's order history records from the server.

If the one or more target images are to be generated by a server, then a client (e.g., a terminal used by the user) that is operatively connected with the server, after receiving the request to display the target page, may request the one or more target images (e.g., corresponding to the user) from the server. In some embodiments, the server generates the one or more target images corresponding to a user in response to receiving a request for one or more target images that correspond to the user (e.g., from a client used by the user). In some embodiments, if the server has generated the one or more target images (e.g., corresponding to the user) in advance (e.g., of receiving a request for the one or more target images corresponding to the user) for the user, then the server simply sends the one or more target images (e.g., to the client used by the user) in response to a request for the one or more target images corresponding to the user. In some embodiments, if the server has not generated the one or more target images (e.g., corresponding to the user) before receiving a request for the one or more target images corresponding to the user, then the server extracts the user's order history records (e.g., in response to a request for the one or more target images corresponding to the user). Thereafter, the server performs 223 and 224 and sends the one or more generated target images to the client.

In some embodiments, at least some of the one or more target images are generated before receiving the request to display the target page or before receiving a request for the one or more target images corresponding to the user. If at least some of the one or more target images are generated (e.g., an arrangement of the one or more product images is generated) before receiving the request to display the target page or before receiving a request for the one or more target images corresponding to the user, then the user can be monitored for new order generation events. Specifically, an account associated with the user, an app used by the user, and/or other objects that track the user's activities can be monitored. If a new order has been generated, product object image information may be extracted from the newly generated order. Thereafter, the at least some of the one or more target images is updated using the newly extracted business object image information. Accordingly, the one or more target images are updated contemporaneously with new order generation events. The contemporaneous update of the one or more target images with new order generation events improves consistency between the one or more target images displayed each time by the page background area and the orders that the user is generating.

In some embodiments, one or more target pages may be selectively displayed. As an example, different target pages can be used to display product object information of different categories. For example, apps that provide comprehensive functionality (e.g., apps that allow a user to purchase various products) can use different target pages to display product object information of different categories. The one or more target pages can respectively display different information. For example, each of the one or more target pages may display different information according to product order history, a user's preferences, a user's settings, a user's browsing history, a user's favorites, the like, or any combination thereof. The type of information displayed on each of the one or more target pages may not be entirely the same. In some embodiments, different target images are generated based on different product object category information. In some embodiments, the request to display a target page includes the product object category information. The product category information can be extracted from the request to display the target page and the product category information can be used to generate the one or more target images. In some embodiments, determination of a target image includes determining the target image corresponding to the category information included in the request to display the target page, and displaying the target image. The target image can be displayed in the background display area of the target page. For example, if a target page corresponds to a page used to display apparel-type product information, then image information corresponding to product objects belonging to the apparel category is displayed. For example, the images can be displayed in the background display area of the target page of the app. As an example, if the target page corresponds to a page used to display apparel-type product information, then the image information corresponding to the product objects belonging to the apparel category in the order records of the current user is the only image information needed for displaying the target page corresponding to a page used to display apparel-type product information in the background display area.

As discussed above, in some embodiments, the one or more target images are generated after the request to display the target page is received (e.g., the one or more target images are generated in response to the request to display the target page). In the event that the one or more target images are generated after the request to display the target page is received, then at least part of the order history records that are the same or similar to the category information included in the request to display the target page can be acquired from the current user's order history records and used to generate target images corresponding to the category information.

As discussed above, in some embodiments, the one or more target images are generated before the request to display the target page is received. In the event that the one or more target images have been generated in advance, then, after at least part of the user's order history records have been obtained, the one or more target images corresponding to each category can be generated based on the category information of the product objects included in the various order history records (e.g., the category information of the product objects included in the user's order history records that were acquired). In some embodiments, at least part of the user's order history can be acquired periodically. In some embodiments, at least part of the user's order history can be acquired contemporaneously with a new order generation event. Accordingly, when a page display request including category information is received, the target images corresponding to the category can be displayed in the page's background display area.

In some embodiments, application information and category information of the product objects corresponding to the display of one or more target images in the background display area can be configured (e.g., according to user preferences, user settings, the like, or any combination), or otherwise set, in advance to facilitate display of target images of corresponding categories in the background display area by the app in the terminal. The request to display the target page may further include application information. In the event that the request to display the target page includes application information, the application information can be used as a basis for determining the category information of the product objects (e.g., associated with the one or more target images to be displayed on the background display area). The determined product object category information can be used as a basis for obtaining the one or more target images corresponding to the category. The obtained one or more target images corresponding to the category are displayed in the background display area of the application page. For example, the corresponding applications are different apps for group purchases of digital products, apparel, appliances, food, and the like. In some embodiments, in the event that the corresponding applications correspond to different apps for different products, the category information of the corresponding product objects can be determined based at least in part on the application information included in the request, and the target images corresponding to the category can be displayed in the background display area of the corresponding page.

In some embodiments, the category associated with the product object in each order record is pre-defined. For example, each product object in a back-end database is tagged with one or more associated categories in advance. Accordingly, the categories associated with the product objects can be determined using the category tags of the product objects.

In some embodiments, in the event that different target images are generated in advance for different product object categories, the generation of new orders (e.g., by the user) can be monitored. In response to detecting (e.g., based on the monitoring of the generation of new orders) that a new order has been generated, product object image information can be extracted from the newly generated order. The category information of the product objects of the newly generated order can be used as a basis for looking up the corresponding target images. Thereafter, the image information of the newly extracted product objects can be used to update the looked up target images.

At 230, at least one of the one or more target images is displayed. In some embodiments, the at least one target image is displayed in the background display area (e.g., of the app target page). In some embodiments, the app corresponding to the background display area is configured to display the one or more target images in response to receiving a request to display the target page. In some embodiments, the app corresponding to the background display area is configured to display the one or more target images in response to obtaining the one or more target images (e.g., from the client terminal, the server, the like, or any combination thereof).

In some embodiments, when the target page is being displayed, the one or more target images determined at 220 may be displayed in the background display area of the target page. In some embodiments, the one or more target images include the corresponding image information from the various order history records of the current user. Accordingly, the user may directly view the generated background images in the background display area. Because image information is more visual and concrete, the user can easily identify products that the user has already selected (e.g., purchased). The position display method of using a background display area helps users gain direct knowledge of part or all of the order history record information in the background display area of the target page.

In some embodiments, the target page is a video target page. For example, in some embodiments, the corresponding app typically can be an app configured specifically for purchasing video product objects (e.g., which serve as equivalents to traditional movie tickets). For example, an app configured for purchasing video product objects can be configured to provide electronic viewing vouchers. The electronic viewing vouchers can be generated or otherwise provided based at least in part on preset operations by the user vis-à-vis designated video product objects. The app configured for purchasing video product images can be configured to generate, or otherwise provide, corresponding order records. The order records can include image introductions (such as poster images) to video product objects. The image introductions can be designated in advance (e.g., by the user or the system). In some embodiments, the objective of immediately attracting people's gazes is achieved through the composition of the page layout. Therefore, in some embodiments, when the personal homepage of the app is entered (e.g., displayed), the image information included in each user order history record of the audiovisual product category is displayed in the background display area of the personal homepage. The display of the image information in the background display area allows the user to directly learn, from the user's personal homepage, which movies have been reserved with electronic viewing vouchers.

Figure 3A:
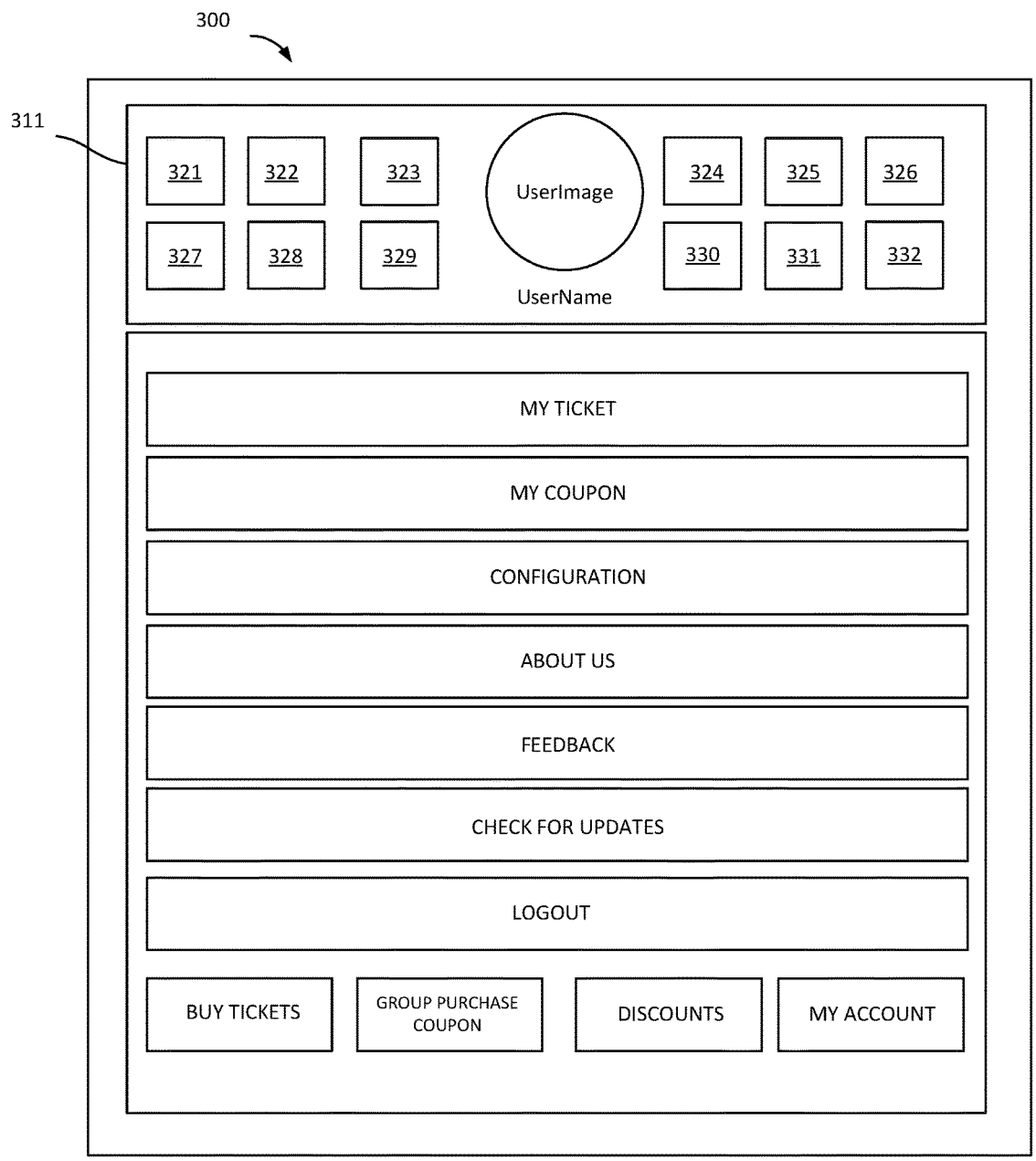
FIG. 3A is an illustration of a target page according to various embodiments of the present disclosure.

FIG. 3A is an illustration of a target page according to various embodiments of the present disclosure.

Referring to FIG. 3A, a target page 300 is provided. The target page 300 includes a background display area 311. In some embodiments, the background display area 311 can be populated with one or more images (e.g., target images, electronic viewing vouchers). The background display area 311 can be populated with the one or more images using method 200 illustrated in FIG. 2A. In some embodiments, the background display area 311 is implemented by, or otherwise displayed by, a device such as device 1000 illustrated in FIG. 10, device 1100 illustrated in FIG. 11, or the like. In some embodiments, the background display area 311 is implemented by, or otherwise displayed by, system 900 illustrated in FIG. 9.

In some embodiments, the background display area 311 is divided into a plurality of zones. For example, as illustrated in FIG. 3A, the background display area 311 can be divided into 12 zones—zone 321, zone 322, zone 323, zone 324, zone 325, zone 326, zone 327, zone 328, zone 329, zone 330, zone 331, and zone 332. In some embodiments, each of the plurality of zones is populated with a respective one of the one or more images generated using the technique described above.

Figure 3B:
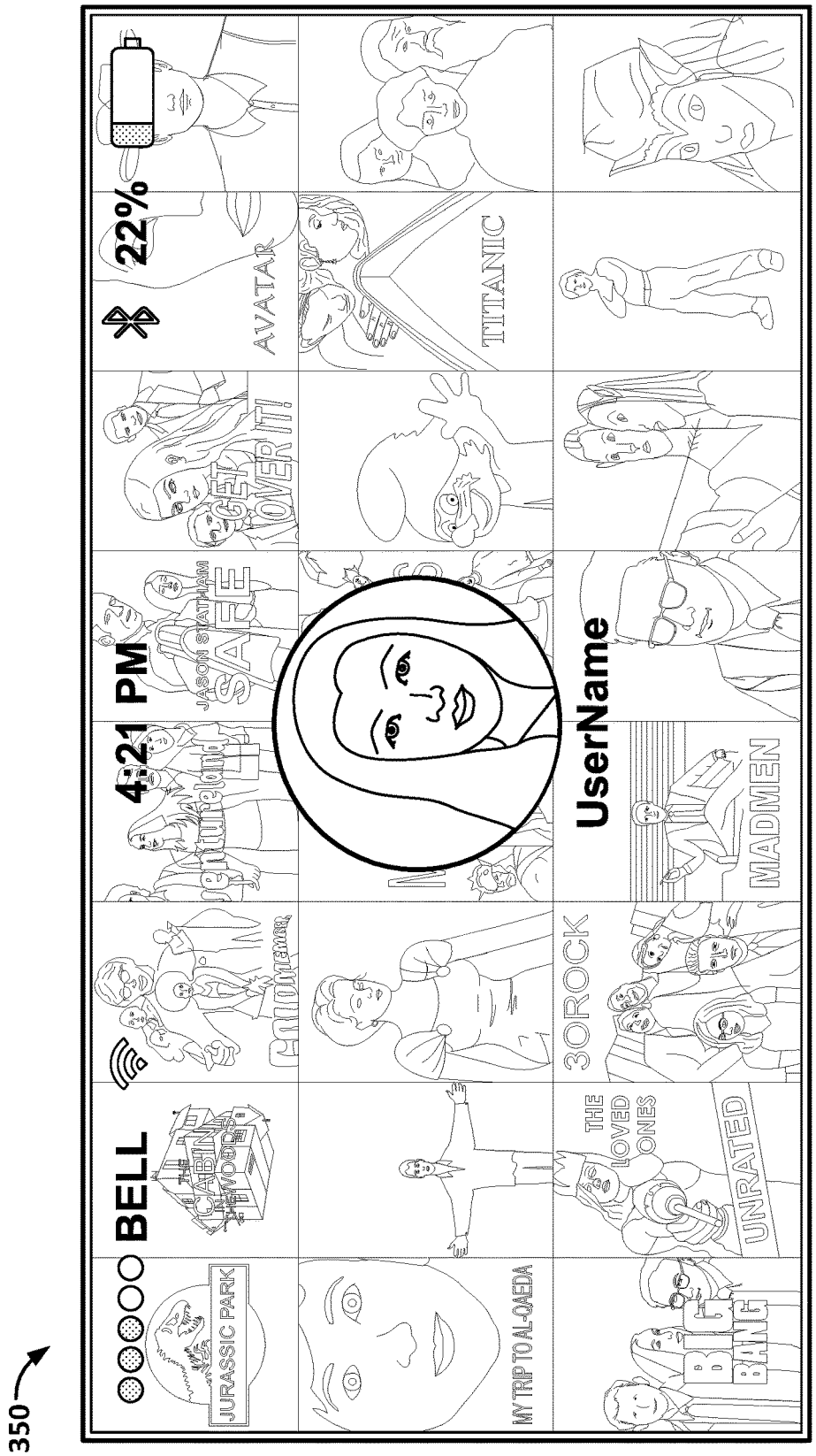
FIG. 3B is an illustration of a background display area according to various embodiments of the present disclosure.

FIG. 3B is an illustration of a background display area according to various embodiments of the present disclosure.

Referring to FIG. 3B, a background display area 350 is provided. In some embodiments, the background display area 350 can be populated with one or more images (e.g., target images, electronic viewing vouchers). The background display area 350 can be populated with the one or more images using method 200 illustrated in FIG. 2A. In some embodiments, the background display area 350 is implemented by, or otherwise displayed by, a device such as device 1000 illustrated in FIG. 10, device 1100 illustrated in FIG. 11, or the like. In some embodiments, the background display area 350 is implemented by, or otherwise displayed by, system 900 illustrated in FIG. 9. As shown, a foreground image (such as the photo of the user) is rendered to be on top of at least a part of the background display area.

As illustrated in FIG. 3B, image information corresponding to 24 electronic viewing vouchers is displayed in the background display area 350. For example, the background display area 350 can be divided into 24 zones, and each of the 24 zones is populated with a respective electronic viewing voucher. In some embodiments, the electronic viewing voucher is an image. Each image can perform a function in relation to conveying information related to the movie title, content, the like, or any combination thereof. In addition, because some aesthetic and other factors were already considered when the image information was designed, and because the length-width ratios of images corresponding to different electronic viewing platforms are relatively standard, a relatively good visual effect can still be achieved in the background display area when the images are combined for display in a background display area.

In some embodiments, the image information for all product objects can be combined into one image and then displayed in the background display area of the target page.

In some embodiments, the image information of each product object can be dynamically added to the background display area of the target page. In the event that the image information of each product object is dynamically added to the background display area of the target page, the background display area can be pre-partitioned into a preset number of display zones. In some embodiments, the respective image information (e.g., the extracted product object image information) can be added to, and displayed in, each display zone of the background display area. Target pages are thereby generated.

Figure 4:
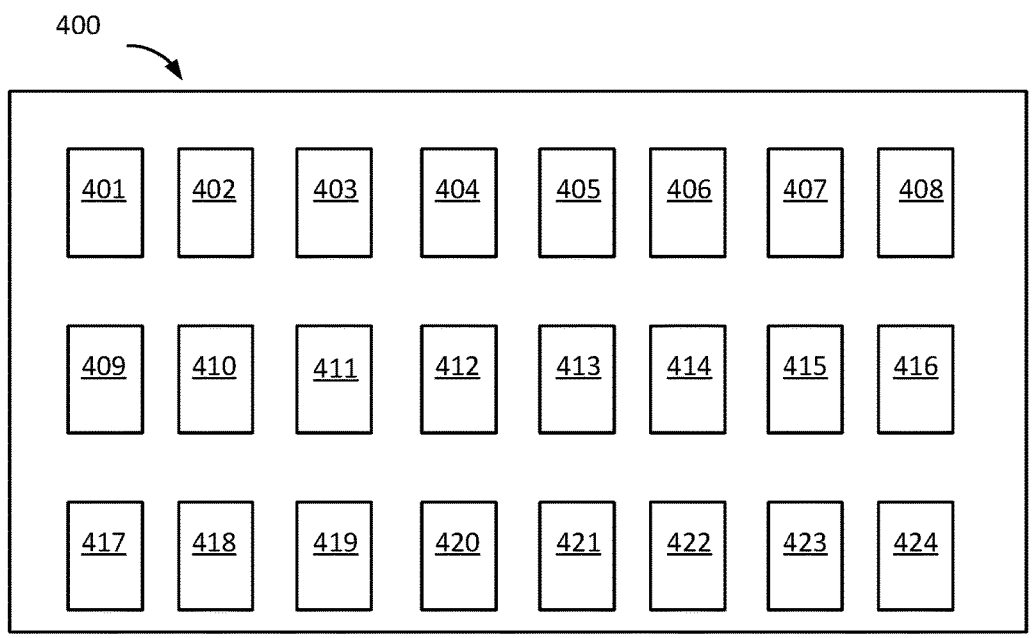
FIG. 4 is an illustration of an order image display according to various embodiments of the present disclosure.

FIG. 4 is an order picture display diagram according to various embodiments of the present disclosure.

Referring to FIG. 4, a background display area 400 is provided. In some embodiments, the background display area 400 can be populated with one or more images (e.g., target images for electronic viewing vouchers). The background display area 400 can be populated with the one or more images using method 200 illustrated in FIG. 2A. In some embodiments, the background display area 400 is implemented by, or otherwise displayed by, a device such as device 1000 illustrated in FIG. 10, device 1100 illustrated in FIG. 11, or the like. In some embodiments, the background display area 400 is implemented by, or otherwise displayed by, system 900 illustrated in FIG. 9.

For example, as illustrated in FIG. 4, the background display area 400 (e.g., the area corresponding to 111 in FIG. 1) may be divided into 24 display zones (e.g., zones 401 through 424). The display zones may be configured as 8 display zones per row and a total of 3 rows. In some embodiments, product object image information can be populated in (e.g., added to) each display zone of the background display area 400.

In some embodiments, the background display area may include information from which a user is informed of the most recent generated orders (e.g., a preset number of previous orders, a set of previous orders placed before a threshold date or number of days, the like, or any combination thereof). In some embodiments, to help a user learn about the product object information for the orders that the user most recently generated, the generation time information for at least part of the order history records of the current user can be acquired. In some embodiments, the order of the image information for the corresponding extracted product objects in each of acquired record information (or portion thereof) is determined. The product object image information can be added to each display zone in the background display area based on the determined order. For example, the product object image information for the corresponding extracted product objects can be added to a respective display zone in the background display area in the determined order. In some embodiments, each display zone may be pre-ranked (e.g., each display zone is numbered according to the order shown in FIG. 4). In the event that each display zone displays a respective one of the product object images, the numbering of the product object image information can be made consistent with the numbering of the display zones. For example, display zone no. 1 (e.g., corresponding to zone 401 displayed in FIG. 4) displays the picture information for the product object that is numbered 1, display zone no. 2 (e.g., corresponding to zone 402 displayed in FIG. 4) displays the picture information for the product object that is numbered 2, and the like. In this way, the product object picture information corresponding to the order history records most recently generated can be displayed in the front-most display zones. In other words, some embodiments ensure that pictures corresponding to orders for recent purchases are placed at the very front. In some embodiments, the determined order for display of the product object image information can be based on a value of the orders (e.g., from the most expensive to the least expensive, from the least expensive to the most expensive, or the like). In some embodiments, the determined order for display of the product object image information can be based on a vendor associated with the order (e.g., based on an alphabetical order of the corresponding vendor names). In some embodiments, the determined order for display of the product object image information can be based on a category type of each of the extracted product objects.

Figure 5:
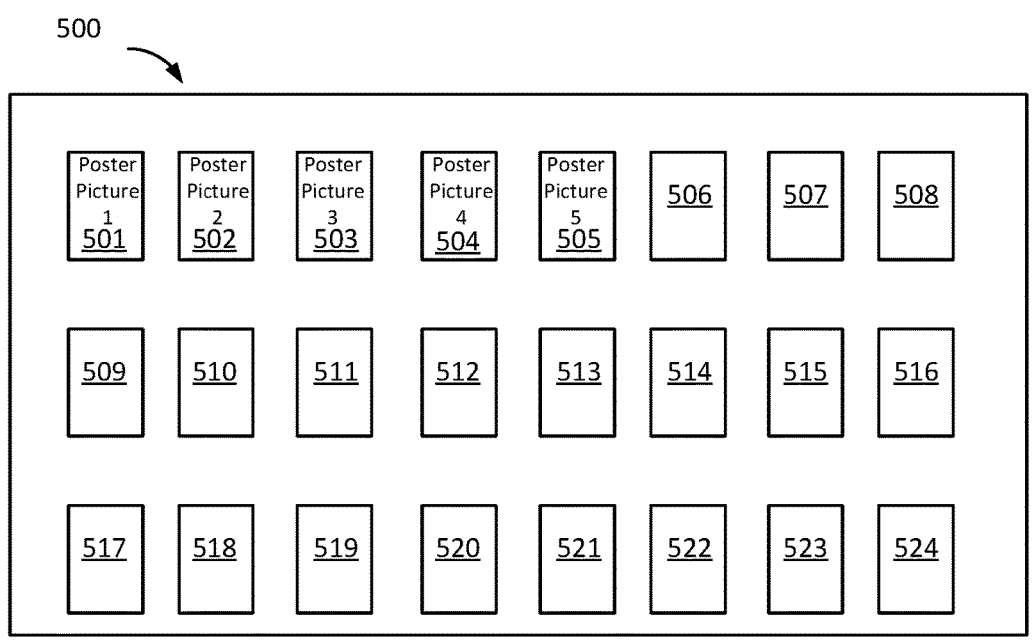
FIG. 5 is an illustration of an order image display according to various embodiments of the present disclosure.

FIG. 5 is an illustration of an order image display according to various embodiments of the present disclosure.

Referring to FIG. 5, a background display area 500 is provided. In some embodiments, the background display area 500 can be populated with one or more images (e.g., target images, electronic viewing vouchers). The background display area 500 can be populated with the one or more images using method 200 illustrated in FIG. 2A. In some embodiments, the background display area 500 is implemented by, or otherwise displayed by, a device such as device 1000 illustrated in FIG. 10, device 1100 illustrated in FIG. 11, or the like. In some embodiments, the background display area 500 is implemented by, or otherwise displayed by, system 900 illustrated in FIG. 9.

In some embodiments, in the event that the number of order history records M is less than the number of display zones N, then the product object images corresponding to order history records can be displayed in the first M display zones. In some embodiments, default images can be displayed in display zones M+1 through N (e.g., in the last (N-M) zones). As illustrated in FIG. 5, the background display area can include 24 display zones. In the event that the number of a user's orders (e.g., the number of order history records) is less than 24 and, assuming that the order history records include 5 orders, then display zones 1 through 5 (e.g., corresponding to zones 501-505 of FIG. 5) display the respective poster images corresponding to the orders (e.g., poster images 1 through 5 are respectively displayed in display zones 1 through 5). Display zones 6 through 24 (zones 506-524 of FIG. 5) display system default posters. In some embodiments, the system default image is fixed.

Figure 6:
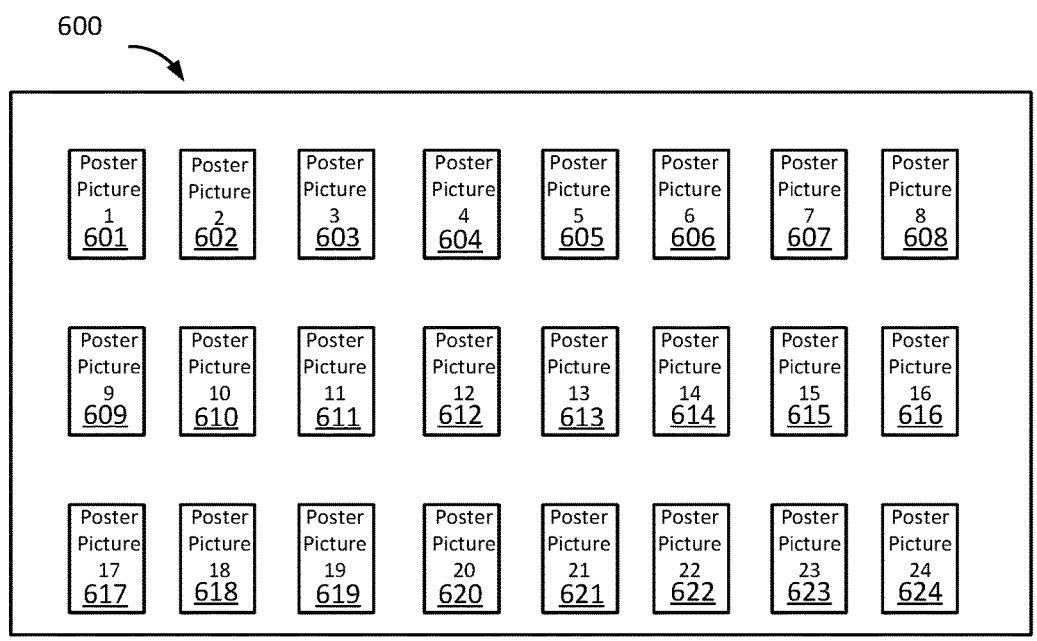
FIG. 6 is an illustration of an order image display according to various embodiments of the present disclosure.

FIG. 6 is an illustration of an order image display according to various embodiments of the present disclosure.

Referring to FIG. 6, a background display area 600 is provided. In some embodiments, the background display area 600 can be populated with one or more images (e.g., target images, electronic viewing vouchers). The background display area 600 can be populated with the one or more images using method 200 illustrated in FIG. 2A. In some embodiments, the background display area 600 is implemented by, or otherwise displayed by, a device such as device 1000 illustrated in FIG. 10, device 1100 illustrated in FIG. 11, or the like. In some embodiments, the background display area 600 is implemented by, or otherwise displayed by, system 900 illustrated in FIG. 9.

In some embodiments, in the event that the number of order history records M is greater than the number of display zones N, then the system displays only the product object images corresponding to the first N order history records in the N display zones (e.g., one of the first N order history records is displayed in a respective one of the N display zones). In other words, in the example described above, in the event that the number of user orders is greater than 24 (e.g., 40 orders), then the system can display the poster images included in, or otherwise associated with, the 24 orders most recently generated by the user in display zones 1 through 24 (e.g., corresponding to zones 601-624 illustrated in FIG. 6). As illustrated in FIG. 6, poster image 1 through poster image 24 are respectively displayed in the 24 display zones 601-624.

In various embodiments, order images can be displayed according to other rules or sequences. For example, in the event that the order number M is less than the display zone number N, the area of the first M display zones may also be enlarged so that each order image may be displayed over a larger area and be more clearly visible to the user, and the like.

In some embodiments, in the event that the order number M is larger than the display zone number N, a subset of the orders in the order history for which a corresponding order image is to be displayed in the background display area (e.g., in a corresponding display zone) may be selected based on one or more characteristics of the order. The one or more characteristics that can be used to select the subset of the orders for which a corresponding order image is to be displayed in the background display area can include a category type, a price, a size, a vendor, a delivery address, a quantity, a user's wish list, a user's favorites, and the like, or any combination thereof.

In addition, as illustrated in FIG. 3B, in the layer above the background display area, other information can be displayed. The other information that can be displayed in the layer above the background display area can include the operator (e.g., the communication network), the signal strength, the time, the battery charge, the username, a photograph, the like, or any combination thereof. The other information can be displayed so as to be overlaid with the background display area.

In some embodiments, to further facilitate the user's viewing of detailed information on each order, each order image in the background page display area can be displayed in the form of a link. In some embodiments, the correspondence between each product object image displayed in the background display area and the order history records can be saved. Thus, when a designated product object image in the background display area becomes the subject of an operation, a request can be made (e.g., to the server) to acquire detailed information on the order history record corresponding to the designated product object image and to display a detailed information page. In other words, the user not only can view the product object image information corresponding to each order in the personal homepage, but also can directly obtain a detailed information page for an order (e.g., each order) and view the corresponding order information in greater detail.

In some embodiments, image information included in, or otherwise associated with, order history records is extracted and displayed in the background display area of a target page. Consequently, in some embodiments, the background display area of the target page no longer merely performs the role of improving the esthetic look of the target page, but can be related to the user's historical transaction behavior (or other characteristic such as user's wish list, a user's favorite items, or the like) and help the user to learn order information about such objects (e.g., products from previous purchases). In some embodiments, as orders change (e.g., new orders are generated), the order images displayed in the background area can also change, thereby realizing a "dynamic background wall" as a display result. The order images displayed in the background area can be updated dynamically (e.g., contemporaneously with the generation of an order) to reflect a change in orders (e.g., new orders).

Figure 7A:
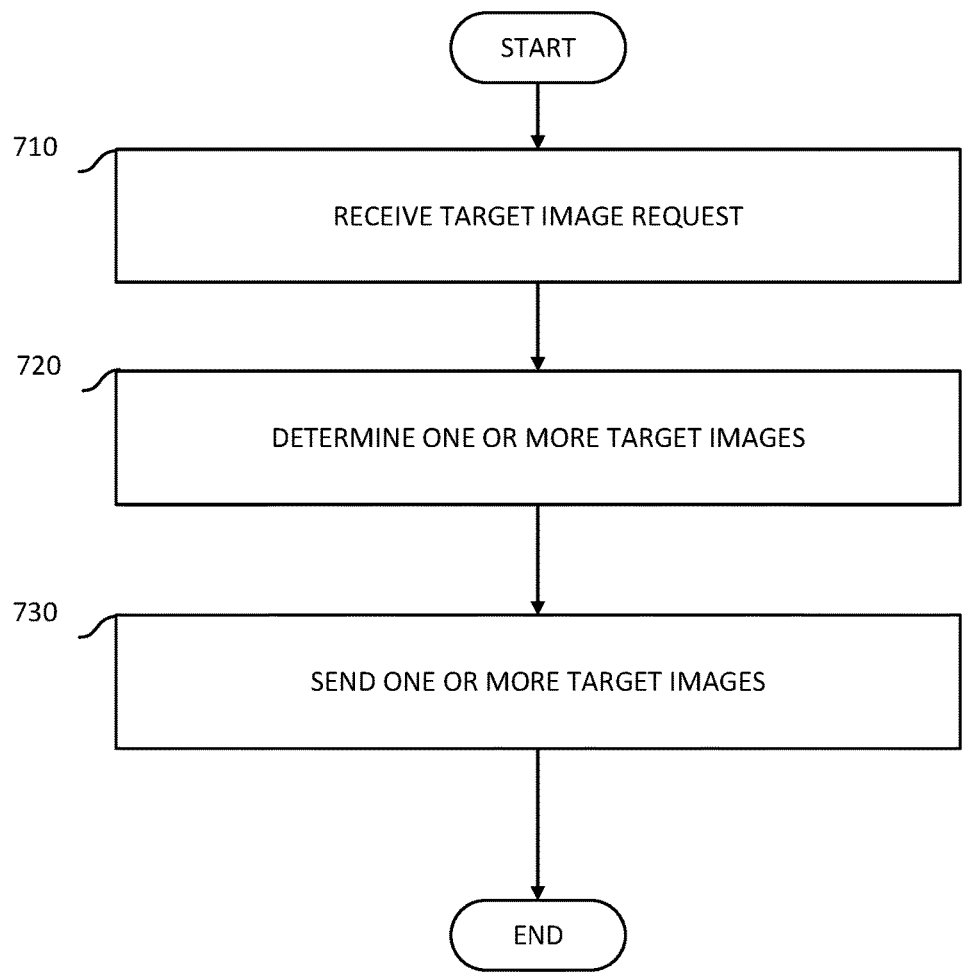
FIG. 7A is a flowchart of a method for displaying order information according to various embodiments of the present disclosure.

FIG. 7A is a flowchart of a method for displaying order information according to various embodiments of the present disclosure.

Referring to FIG. 7A, a method 700 for displaying order information is provided. In some embodiments, the method 700 is implemented by device 1100 illustrated in FIG. 11. In some embodiments, the method 700 is implemented by a system 900 illustrated in FIG. 9. In some embodiments, the method 700 is implemented by device 1200 illustrated in FIG. 12.

In some embodiments, a server can generate one or more target images. The server can generate the one or more target images in response to a request for the one or more target images.

At 710, a target image request is received. In some embodiments, a server receives the target image request. The target image request may be received from a client (e.g., a terminal used by the user).

In some embodiments, the client sends a request to the server to acquire the target images (e.g., the target image request) in response to receiving a request to display the target page. For example, in response to receiving an indication from a user to display a target page, the client sends the target image request.

In some embodiments, the target image request includes a current user identity and other information. For example, the target image request can include an indication of a number of target images to be displayed in the background display area of the target page. As another example, the target image request can include a category type (e.g., of the target images to be displayed on the background display area). The current user identity and other information included in the target image request can be used to determine the target images (e.g., the one or more target images). The server can use the current user identity and other information to determine the one or more target images. For example, using the user identity and other information included in the target image request, the server may determine for which user the one or more target images are to be determined.

At 720, one or more target images are determined. In some embodiments, the server determines the one or more images. In some embodiments, the one or more target images include image information of product objects in at least part of the order history records of the current user.

In some embodiments, the target images are generated after the target image request (e.g., that requests the target images) is received (e.g., in response to the target image request). The target images can be generated in advance of the target image request being received. In the event that the one or more target images are generated after the target image request is received, after receiving the target image request, the server can extract user identity information from the target image request and then, on the basis of data saved in a server database, the server can read the order history records of the user and extract image information of the corresponding product objects from each extracted piece of record information, generate one or more target images based on the image information of each extracted product object, and then send the one or more target images to the client. In the event that the one or more target images are generated in advance of the target image request being received, the server pre-generates one or more target images (e.g., or an arrangement or listing of one or more target images), each of which is based on the order history record of a respective user. Therefore, upon receiving a request to acquire target images (e.g., the target image request), user identity information can be extracted from the target image request. Thereafter, the one or more target images corresponding to the user identity information can be read (e.g., from a server database). After the one or more target images are determined, retrieved, or otherwise generated, the one or more target images are sent to the client.

At 730, the one or more target images are sent. In some embodiments, the server sends the one or more target images to the client. Thereafter, the client can display the one or more target images in a background display area of the target page.

After determining the one or more target images, the one or more target images can be sent to the client. Thus, the client can display the one or more target images in the background display area of the target page.

Figure 7B:
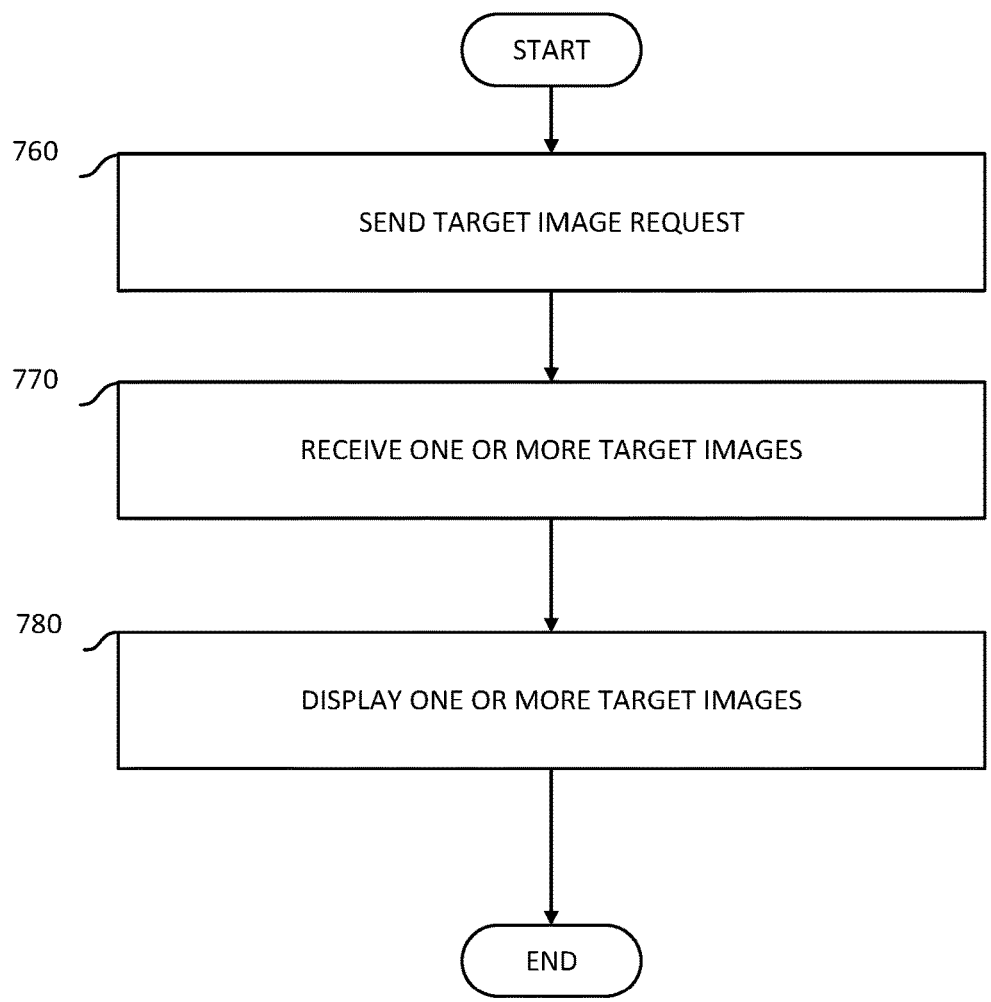
FIG. 7B is a flowchart of a method for displaying order information according to various embodiments of the present disclosure.

FIG. 7B is a flowchart of a method for displaying order information according to various embodiments of the present disclosure.

Referring to FIG. 7B, a method 750 for displaying order information is provided. In some embodiments, the method 750 is implemented by device 1100 illustrated in FIG. 11. In some embodiments, the method 750 is implemented by a system 900 illustrated in FIG. 9. In some embodiments, the method 750 is implemented by device 1200 illustrated in FIG. 12.

At 760, a target image request is sent. In some embodiments, the target image request is sent by a client. The target image request can be sent to a server.

At 770, one or more target images are received. In some embodiments, the one or more target images are received by the client. The one or more target images can be received from the server.

At 780, one or more target images are displayed. In some embodiments, the one or more target images are displayed by the client. The one or more target images can be displayed on a background display area (e.g., of a target page). The one or more target images can be displayed by an application installed on the client that is associated with the target page.

Figure 8A:
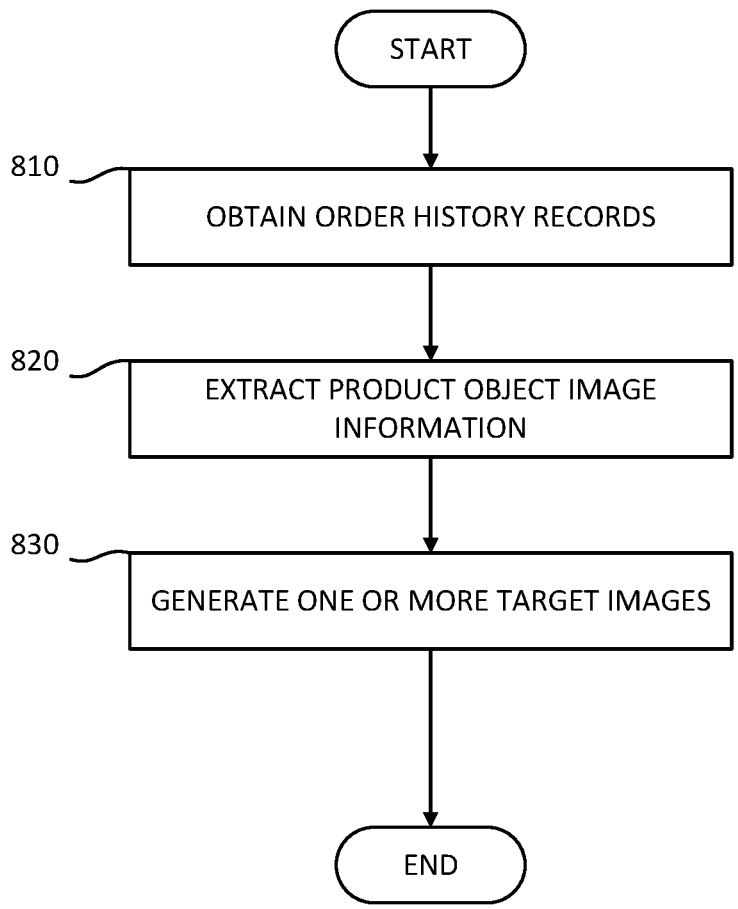
FIG. 8A is a flowchart of a method for displaying order information according to various embodiments of the present disclosure.

FIG. 8A is a flowchart of a method for displaying order information according to various embodiments of the present disclosure.

Referring to FIG. 8A, a method 800 for displaying order information is provided. In some embodiments, the method 800 is implemented by device 1000 illustrated in FIG. 10. In some embodiments, the method 800 is implemented by device 1100 illustrated in FIG. 11. In some embodiments, the method 800 is implemented by a system 900 illustrated in FIG. 9. In some embodiments, the method 800 is implemented by device 1200 illustrated in FIG. 12.

In some embodiments, a server generates one or more target images for display on a background display area.

At 810, order history records are obtained. In some embodiments, at least a part of a user's order history records are obtained. The order history records can be read from a server database. A server can read the order history records (e.g., at least a part of the user's order history records).

At 820, product object image information is extracted. In some embodiments, the server can extract the product object image information. The server can extract corresponding product object image information from each acquired part of record information. For example, the server can extract product object image information corresponding to each part of the order history records that are obtained (e.g., for each order of the user's order history records).

At 830, one or more target images are generated (or determined). In some embodiments, the server generates the one or more target images. The one or more target images can be generated, or otherwise determined, based at least in part on image information for each extracted product object image information (e.g., for each order of the user's order history records). In response to a target image request being received, the one or more target images are sent (e.g., by the server) to the client of the user for the client (e.g., an app installed thereon) to display the one or more target images in the background display area of the target page.

Figure 8B:
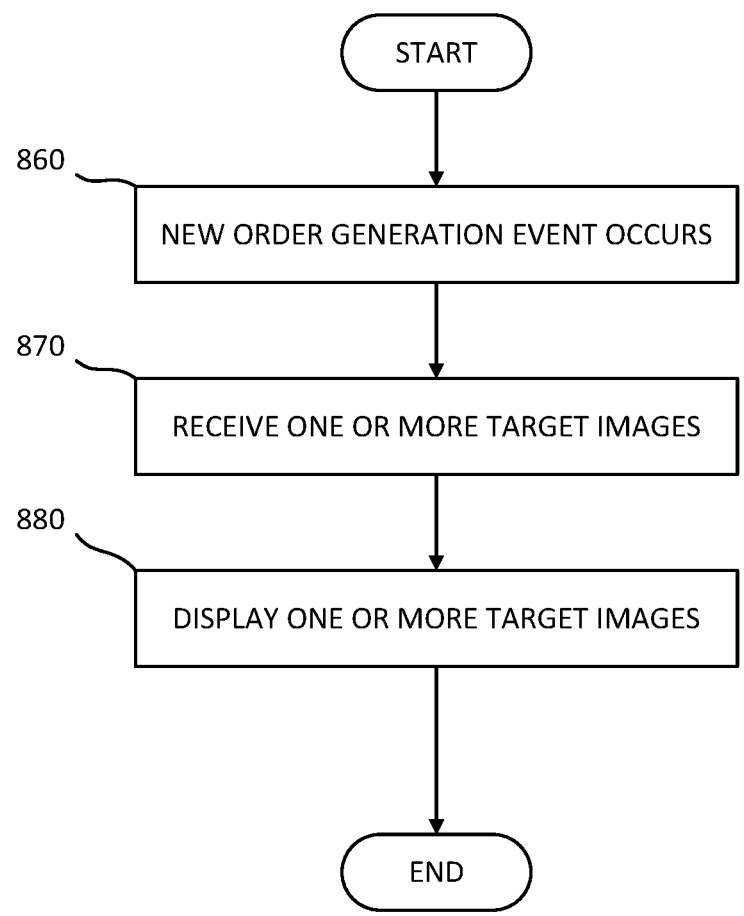
FIG. 8B is a flowchart of a method for displaying order information according to various embodiments of the present disclosure.

FIG. 8B is a flowchart of a method for displaying order information according to various embodiments of the present disclosure.

Referring to FIG. 8B, a method 850 for displaying order information is provided. In some embodiments, the method 850 is implemented by device 1000 illustrated in FIG. 10. In some embodiments, the method 850 is implemented by device 1100 illustrated in FIG. 11. In some embodiments, the method 850 is implemented by a system 900 illustrated in FIG. 9. In some embodiments, the method 850 is implemented by device 1200 illustrated in FIG. 12.

At 860, a new order generation event occurs. In some embodiments, a new order generation event can occur in response to a user placing a new order using the client. For example, the user can place a new order by purchasing a new item using an application installed on the client. The client can communicate with a server, or other service provider, to generate an order. In some embodiments, a new order generation event can occur in response to an order being placed via a terminal other than the client terminal. The terminal other than the client terminal can communicate with a server, or other service provider, to place the order by using the user's credentials (e.g., associated with the server or other service provider).

At 870, one or more target images are received. In some embodiments, the client receives the one or more target images. The one or more target images are sent to the client in response to the occurrence of the new order generation event.

At 880, the one or more target images are displayed. In some embodiments, the client displays the one or more target images. The one or more target images can be displayed in the background display area of a target page (e.g., displayed by an app). The background display area can be updated dynamically to reflect a contemporaneous account of the order history of a user.

Because a user may continually generate new orders, the new user order generation events may be monitored. For example, the server can monitor the new user order generation events. The server can receive an alert or other indication in response to a new order generation event occurring. In response to detection (e.g., by the server) that the user has generated a new order, business object image information can be extracted from the newly generated order. The newly extracted business object image information can be used (e.g., by the server) to update the user's target images. The server can send to the client an update to the target images being displayed in the background display area of the target page so as to update the background display area dynamically or in real-time with occurrence of new order generation events.

In some embodiments, in order to enable different categories of target pages to display order product object information of the corresponding categories, in the event that the server generates one or more target images, the server can generate one or more target images corresponding to the different categories associated with the product objects in the various order history records so that when the server receives a target image request, the server can send one or more target images that correspond to category information to the user client if the target image request includes product object category information. Thus, the client can display the one or more target images corresponding to the category information in the background display area of the target page.

In some embodiments, the generation of new orders by the user can likewise be monitored. In the event that the generation of a new order is detected, product object image information can be extracted from the newly generated order, and the category information of the product objects of the newly generated order can serve as a basis for looking up the user's target images corresponding to the category information. Thereafter, the image information of the newly extracted product objects can be used to update the looked up target images.

Figure 9:
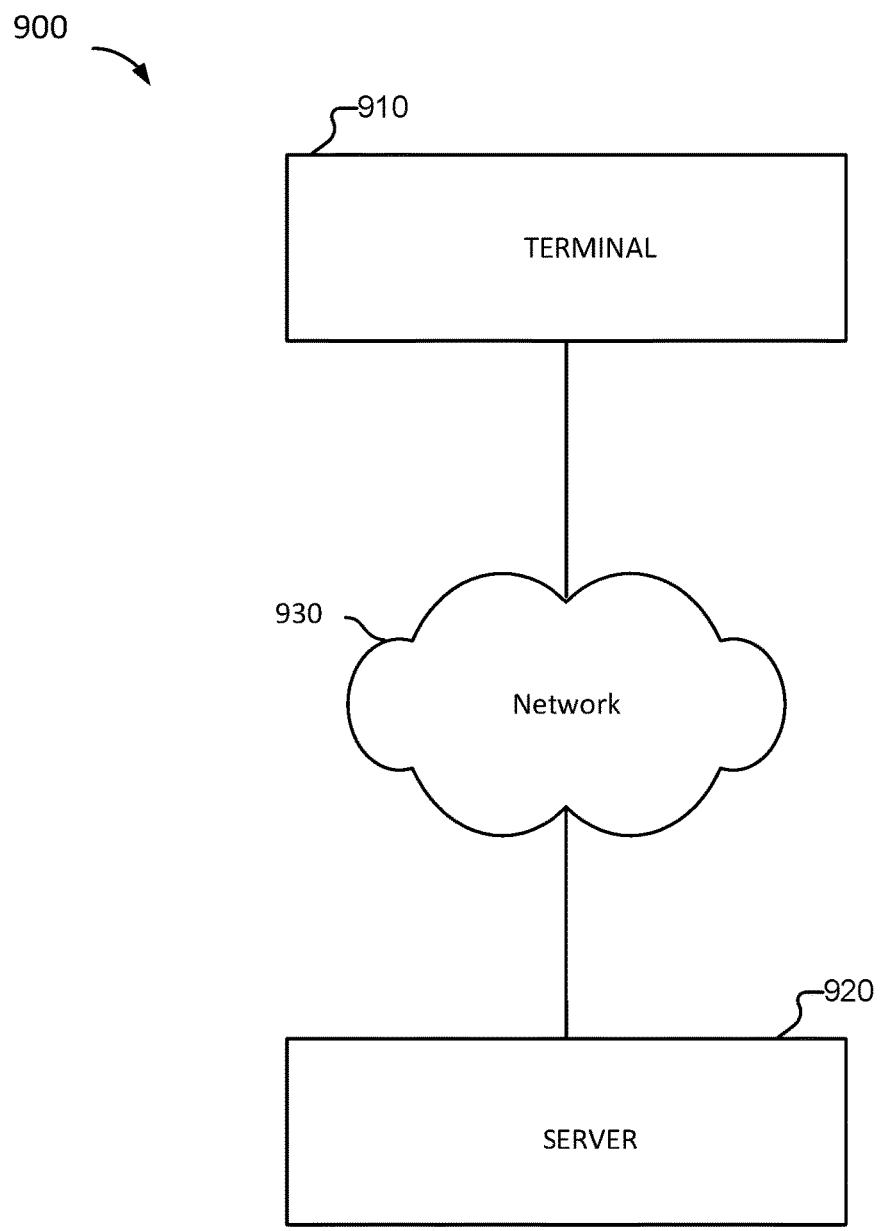
FIG. 9 is a diagram illustrating a system for displaying order information according to various embodiments of the present disclosure.

FIG. 9 is a diagram illustrating a system for displaying order information according to various embodiments of the present disclosure.

Referring to FIG. 9, the system 900 for displaying order information may include a terminal 910, a server 920, and a network 930. As illustrated in FIG. 9, the terminal 910 may communicate with the server 920 across the network 930. In some embodiments, the system 900 implements the method 200 illustrated in FIG. 2A, the method 221 illustrated in FIG. 2B, the method 700 illustrated in FIG. 7A, the method 750 illustrated in FIG. 7B, the method 800 illustrated in FIG. 8A, the method 850 illustrated in FIG. 8B, or any combination thereof.

Figure 10:
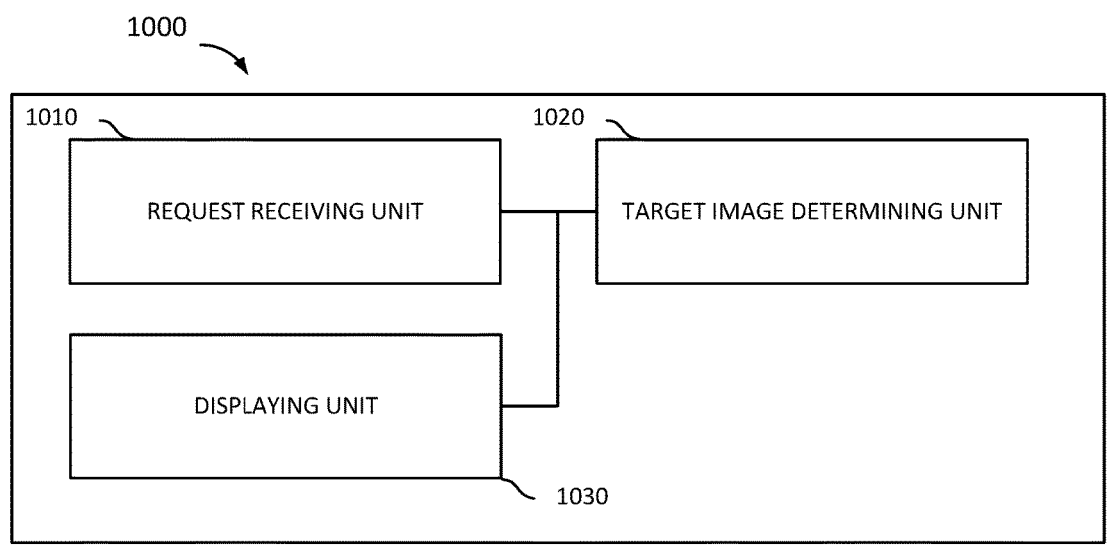
FIG. 10 is a diagram of a device according to various embodiments of the present disclosure.

FIG. 10 is a diagram of a device according to various embodiments of the present disclosure.

Referring to FIG. 10, a device 1000 for displaying order information is provided. In some embodiments the device 1000 implements a method, such as, method 200 illustrated in FIG. 2A, method 221 illustrated in FIG. 2B, method 750 illustrated in FIG. 7B, method 800 illustrated in FIG. 8A, and method 850 illustrated in FIG. 8B.

In some embodiments, the device 1000 is a client (e.g., a user terminal used by a user). The device 1000 includes a request receiving unit 1010, and a displaying unit 1030. In some embodiments, the device 1000 includes a target image determining unit 1020.

The request receiving unit 1010 is configured to receive a request to display a target page. The target page includes a background display area.

The target image determining unit 1020 is configured to determine target images. The target images (e.g., determined by the target image determining unit 1020) include image information of product objects in at least part of the order history records of the current user.

The displaying unit 1030 is configured to display target images in the background display area.

In some embodiments, the target image determining unit 1020 includes an order record acquiring unit, an image information extracting unit, and a target image generating unit. The order record acquiring unit can be configured to acquire at least part of the order history records of the current user based on current user information.

The image information extracting unit can be configured to extract corresponding product object image information from each acquired piece of record information.

The target image generating unit can be configured to generate the target images based on the image information for each extracted product object.

In some embodiments, the target images are generated after the display application page request is received. In some embodiments, the target images are generated in advance before the display application page request is received. In some embodiments, the entity (e.g., device) that executes target image generation may be a client, server, or the like.

In some embodiments, the device 1000 also includes a monitoring unit. The monitoring unit can be configured to monitor events generated in connection with new orders (e.g., the user's new orders).

In some embodiments, the image information extracting unit is further configured to extract product object image information from newly generated orders in response to detection that a new order has been generated. The image information extracting unit can be configured to extract product object image information from newly generated orders in response to detection that a new order has been generated in connection with the user's account.

In some embodiments, the target image generating unit is further configured to use newly extracted product object image information to update the target images.

In some embodiments, in the event that the request to display the target page includes product object category information, then the order record acquiring unit can be configured to acquire at least part of the order history records that are the same as or similar to the category information from among the order history records of the current user so as to generate target images corresponding to said category information. Order history records that can be determined to be similar to the category information in relation to a similarity threshold are acquired or displayed.

In some embodiments, with regards to classifying and displaying order information, the device 1000 may further include a monitoring unit and a looking up unit.

In some embodiments, the monitoring unit is configured to monitor events generated in connection with the user's new orders.

In some embodiments, the image information extracting unit is further configured to extract product object image information from newly generated orders in the event that the device 1000 (e.g., the monitoring unit) detects that a new order has been generated.

In some embodiments, the looking up unit is configured to search for (e.g., look up) target images corresponding to the category information of the newly generated order product objects.

In some embodiments, the target image generating unit is further configured to use newly extracted product object image information to update target images that were newly looked up.

In some embodiments, the background display area (of the page) is pre-divided into a preset number of display zones.

In some embodiments, the target image generating unit is configured to add (e.g., separately) the image information for each extracted product object to each display zone in the background display area and to generate the target images.

In some embodiments, the target image generating unit can include an image order determining sub-unit and an order displaying sub-unit.

The image order determining sub-unit can be configured to determine, on the basis of acquired generation time information for at least part of the order history records of the current user, the order of image information on corresponding product objects extracted from the information of the various acquired records.

The order displaying sub-unit can be configured to add product object image information in the determined order to each display zone of the background display area.

In some embodiments, if the number of order history records M is less than the number of the display zones N, then the system can display the product object images corresponding to the various order history records in the first M display zones only.

In some embodiments, default images are displayed in display zones M+1 to N. Default images can be set according to user preferences, user settings, service provider settings, or the like.

In some embodiments, if the number of order history records M is greater than the number of said display zones N, then the system displays only the product object images corresponding to the first N order history records in all the display zones.

In some embodiments, to facilitate user viewing of detailed information pages for each order, the device 1000 may further include one or more of a correspondence saving unit and a detailed information page display unit.

The correspondence saving unit can be configured to save correspondences between the various product object images displayed in the background display area and order history records.

The detailed information page display unit can be configured to acquire detailed information on the order history record corresponding to a designated product object image when an operation is performed on the designated product object image in the background display area, and to display a detailed information page.

In some embodiments, the application is configured to generate an electronic viewing voucher in accordance with a preset operation by the user on a designated video product object and generate a corresponding order record. The order record can include a content prompt image for the designated visual product object. In this case, the target page is a visual product target page, said target images including image information of visual product objects in at least part of the order history records of the current user.

In some embodiments, the application is an application that is installed (e.g., and executed) on a mobile device.

In some embodiments, image information included in order history records is extracted and displayed in the background display area of a target page. Consequently, the background display area of the target page no longer merely performs the role of improving the esthetic look of the page. The background display area can be related to the user's historical transaction behavior and help the user learn order information about previous purchases.

Figure 11:
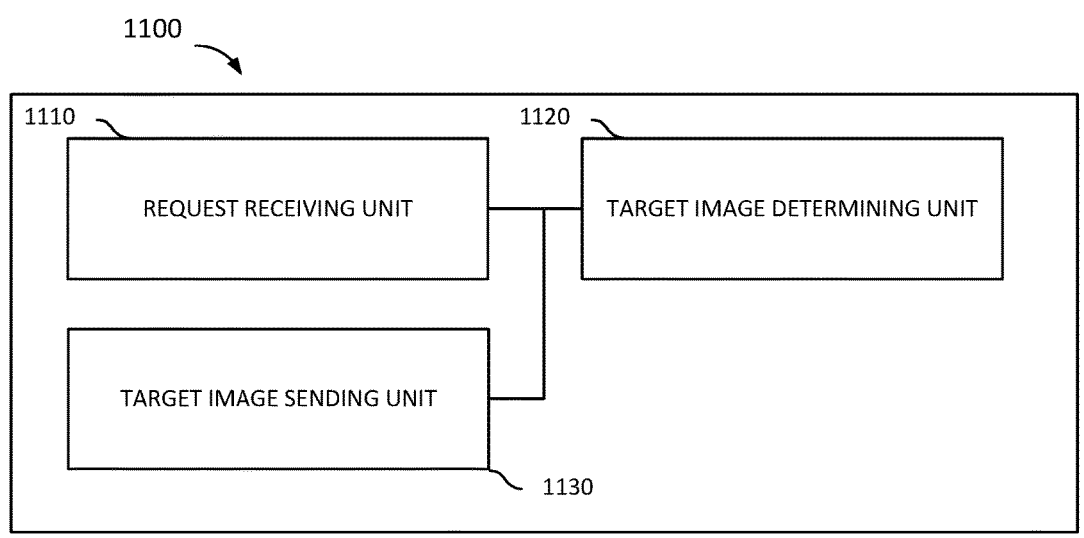
FIG. 11 is a diagram of a device according to various embodiments of the present disclosure.

FIG. 11 is a diagram of a device according to various embodiments of the present disclosure.

Referring to FIG. 11, a device 1100 for displaying order information is provided. In some embodiments the device 1100 implements a method, such as, method 200 illustrated in FIG. 2A, method 221 illustrated in FIG. 2B, method 700 illustrated in FIG. 7A, method 800 illustrated in FIG. 8A, and method 850 illustrated in FIG. 8B.

In some embodiments, the device 1100 corresponds to, or is otherwise included in, a server (e.g., a server in connection with a client). The device 1100 includes a request receiving unit 1110, a target image determining unit 1120, and a target image sending unit 1130.

In some embodiments, the request receiving unit 1110 is configured to receive a target image acquisition request from a client.

In some embodiments, the target image determining unit 1120 is configured to determine target images. The target images can include image information of product objects in at least part of the order history records of the current user.

In some embodiments, the target image sending unit 1130 is configured to send the target images to the client (e.g., for the client to display the target images in a background display area of the target page).

Various embodiment of the present disclosure further provide a device (which corresponds to the method for generating display images for a background display area) for generating display images for a background display area.

Figure 12:
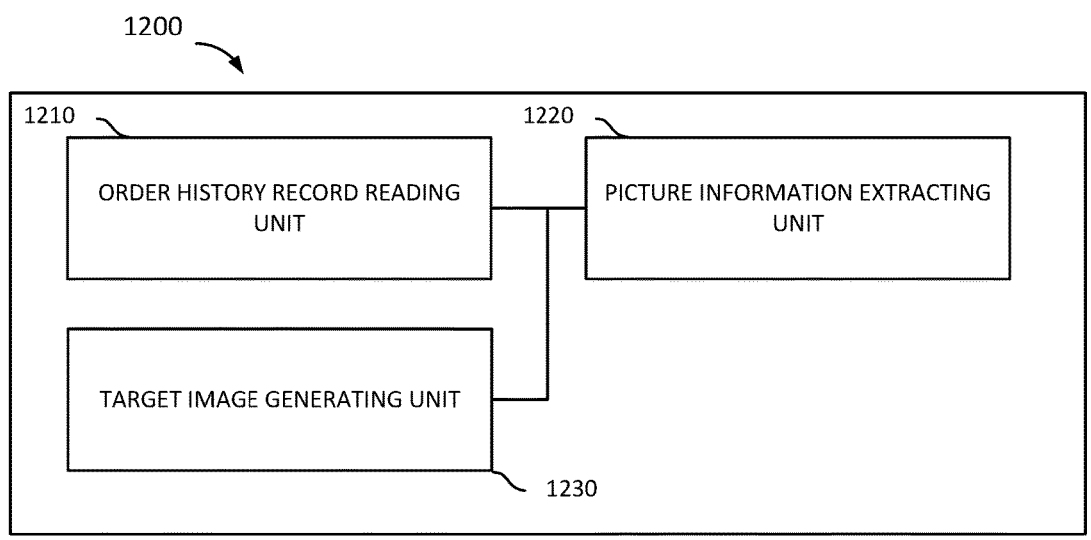
FIG. 12 is a diagram of a device according to various embodiments of the present disclosure.

FIG. 12 is a diagram of a device according to various embodiments of the present disclosure.

Referring to FIG. 12, a device 1200 for displaying order information is provided. In some embodiments the device 1200 implements a method, such as, method 200 illustrated in FIG. 2A, method 221 illustrated in FIG. 2B, method 750 illustrated in FIG. 7B, method 800 illustrated in FIG. 8A, and method 850 illustrated in FIG. 8B.

In some embodiments, the device 1200 is a client (e.g., a user terminal used by a user). In some embodiments, the device 1200 corresponds to, or is otherwise included in, a server (e.g., a server in connection with a client). In some embodiments, the device 1200 includes an order history record reading unit 1210, a picture information extracting unit 1220, and a target image generating unit 1230.

In some embodiments, the order history record reading unit 1210 is configured to read at least part of the order history records of a user.

In some embodiments, the picture information extracting unit 1220 is configured to extract corresponding product object image information from each acquired part of the record information.

In some embodiments, the target image generating unit 1230 is configured to generate target images based on image information for each extracted business object. For example, the target image generating unit 1230 can be configured to generate the target images so that, in response to receiving a request to display the target page, the target images are sent (e.g., returned) to the client of the user and the target images are displayed in the background display area of the target page.

In some embodiments, the device 1200 further includes a monitoring unit. The monitoring unit can be configured to monitor events generated in connection with the user's new orders.

In some embodiments, the picture information extracting unit 1220 is further configured to extract product object image information from newly generated orders in response to detection that a new order has been generated.

In some embodiments, the target image generating unit 1230 is further configured to use newly extracted product object image information to update the target images.

In some embodiments, in order to be able to display target images associated with order history records of the corresponding categories for target pages of different categories, the target image generating unit 1230 is further configured to use the categories associated with business objects in the various order history records as a basis for separately generating target images corresponding to the different categories so that, in the event that a target image request is received and the target image request includes product object category information, then the target images corresponding to the category information are sent (e.g., returned) to the user client and the target images are displayed in the background display area of the target page.

In some embodiments, the device 1200 includes one or more of a monitoring unit and a looking up unit.

The monitoring unit can be configured to monitor events generated in connection with the user's new orders.

In some embodiments, the picture information extracting unit 1220 is further configured to extract product object image information from newly generated orders in response to detection that a new order has been generated.

In some embodiments, the looking up unit is configured to search for (e.g., look up) target images corresponding to the category information of product objects in newly generated orders.

In some embodiments, the target image generating unit 1230 is further configured to use newly extracted product object image information to update target images that were newly looked up.

Figure 13:
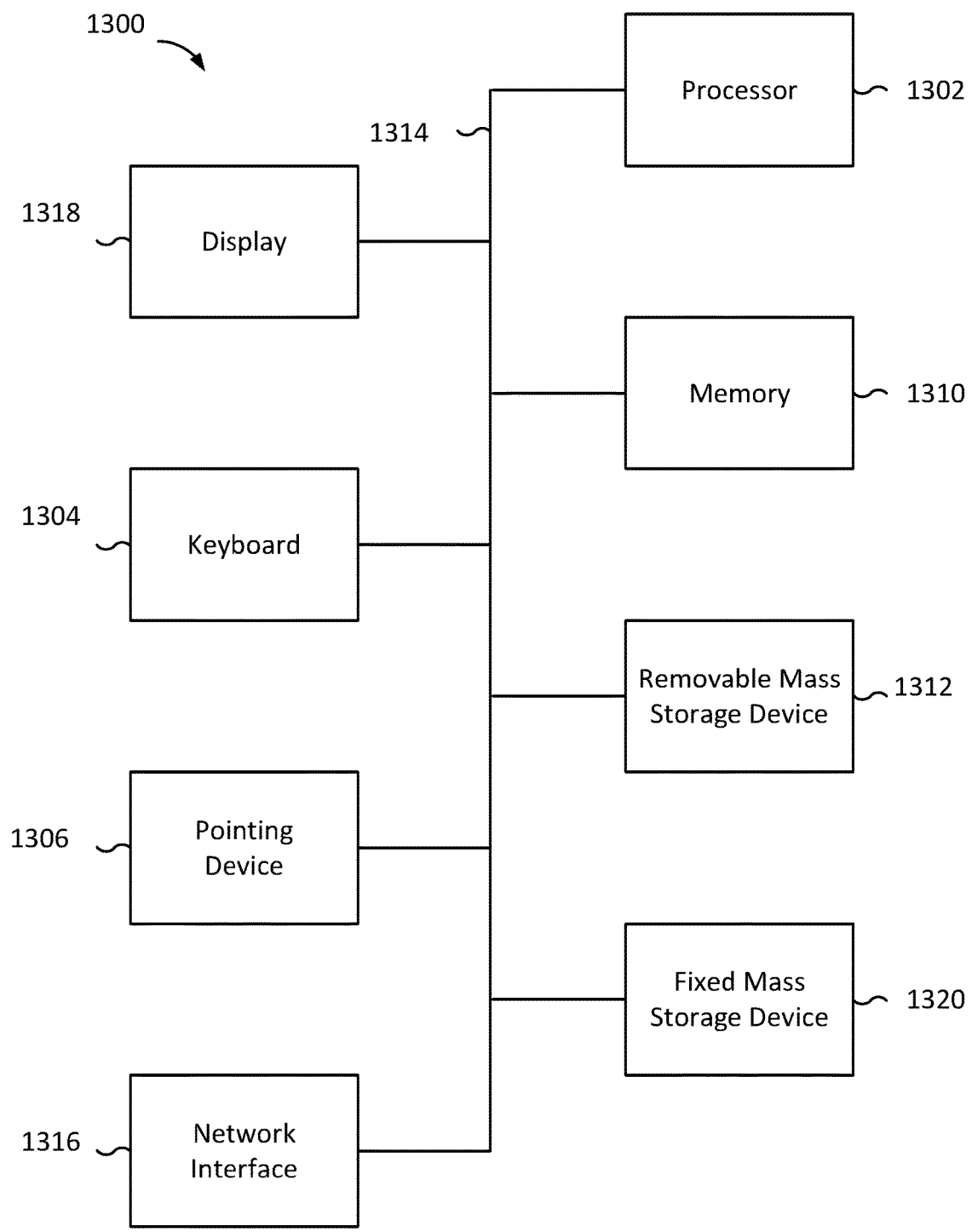
FIG. 13 is a functional diagram of a computer system for accessing a website or for determining whether a terminal accessing the website is a mobile terminal, according to various embodiments of the present disclosure.

FIG. 13 is a functional diagram of a computer system for accessing a website or for determining whether a terminal accessing the website is a mobile terminal, according to various embodiments of the present disclosure.

Referring to FIG. 13, a computer system 1300 for accessing a website or for determining whether a terminal accessing the website is a mobile terminal is provided. As will be apparent, other computer system architectures and configurations can be used to implement video calls. Computer system 1300, which includes various subsystems as described below, includes at least one microprocessor subsystem (also referred to as a processor or a central processing unit (CPU)) 1302. For example, processor 1302 can be implemented by a single-chip processor or by multiple processors. In some embodiments, processor 1302 is a general purpose digital processor that controls the operation of the computer system 1300. Using instructions retrieved from memory 1310, the processor 1302 controls the reception and manipulation of input data, and the output and display of data on output devices (e.g., display 1318).

Processor 1302 is coupled bi-directionally with memory 1310, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1302. Also as is well known in the art, primary storage typically includes basic operating instructions, program code, data, and objects used by the processor 1302 to perform its functions (e.g., programmed instructions). For example, memory 1310 can include any suitable computer-readable storage media, described below, depending on whether, for example, data access needs to be bi-directional or uni-directional. For example, processor 1302 can also directly and very rapidly retrieve and store frequently needed data in a cache memory (not shown).

A removable mass storage device 1312 provides additional data storage capacity for the computer system 1300, and is coupled either bi-directionally (read/write) or uni-directionally (read only) to processor 1302. For example, storage 1312 can also include computer-readable media such as magnetic tape, flash memory, PC-CARDS, portable mass storage devices, holographic storage devices, and other storage devices. A fixed mass storage 1320 can also, for example, provide additional data storage capacity. The most common example of mass storage 1320 is a hard disk drive. Mass storage device 1312 and fixed mass storage 1320 generally store additional programming instructions, data, and the like that typically are not in active use by the processor 1302. It will be appreciated that the information retained within mass storage device 1312 and fixed mass storage 1320 can be incorporated, if needed, in standard fashion as part of memory 1310 (e.g., RAM) as virtual memory.

In addition to providing processor 1302 access to storage subsystems, bus 1314 can also be used to provide access to other subsystems and devices. As shown, these can include a display monitor 1318, a network interface 1316, a keyboard 1304, and a pointing device 1306, as well as an auxiliary input/output device interface, a sound card, speakers, and other subsystems as needed. For example, the pointing device 1306 can be a mouse, stylus, track ball, or tablet, and is useful for interacting with a graphical user interface.

The network interface 1316 allows processor 1302 to be coupled to another computer, computer network, or telecommunications network using a network connection as shown. For example, through the network interface 1316, the processor 1302 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1302 can be used to connect the computer system 1300 to an external network and transfer data according to standard protocols. For example, various process embodiments disclosed herein can be executed on processor 1302, or can be performed across a network such as the Internet, intranet networks, or local area networks, in conjunction with a remote processor that shares a portion of the processing. Additional mass storage devices (not shown) can also be connected to processor 1302 through network interface 1316.

An auxiliary I/O device interface (not shown) can be used in conjunction with computer system 1300. The auxiliary I/O device interface can include general and customized interfaces that allow the processor 1302 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 13 is but an example of a computer system suitable for use with the various embodiments disclosed herein. Other computer systems suitable for such use can include additional or fewer subsystems. In addition, bus 1314 is illustrative of any interconnection scheme serving to link the subsystems. Other computer architectures having different configurations of subsystems can also be utilized.

The modules described above can be implemented as software components executing on one or more general purpose processors, as hardware such as programmable logic devices, and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving a request to display a target page, wherein the target page includes a background display area and a foreground display area; and
   in response to receiving the request to display the target page:

determining a target image to be displayed in the background display area, wherein the target image includes image information associated with a product object in at least part of order history records of a current user;

causing the target image to be displayed in the background display area; and dynamically updating the background display area based at least in part on a change to the order history records of the user.

2. The method as described in claim 1, wherein the determining of the target image comprises:

obtaining at least part of the order history records of the current user;

extracting corresponding product object image information from record information associated with the at least part of the order history records of the current user; and generating the target image based at least in part on the extracted corresponding product object image information.

3. The method as described in claim 2, wherein the request to display the target page includes product object category information, and wherein the extracting of the corresponding product object image information from the record information associated with the at least part of order history records of the current user comprises:

acquiring at least part of the order history records that is determined to match the product object category information from among the order history records of the current user, wherein the at least part of the order history records that is determined to match the product object category information is determined according to a similarity threshold.

4. The method as described in claim 3, wherein:

the request to display the target page comprises application information; and the product object category information is determined according to the application information.

5. The method as described in claim 3, further comprising:

detecting a new order generation event of the current user;

in response to detecting the new order generation event, extracting newly extracted product object image information from a newly generated order associated with the new order generation event;

searching for target images corresponding to the category information of product objects associated with the newly generated order; and updating found target images associated with the searching for the target images, wherein the found target images are updated by using the newly extracted product object image information.

6. The method as described in claim 2, wherein:

the background display area comprises a plurality of display zones; and the generating of the target image based on the product object image information for each extracted product object comprises:

adding the product object image information for each extracted product object to a corresponding separate one of the plurality of display zones in the background display area, and generating the target page.

7. The method as described in claim 6, wherein the adding of the product object image information for each extracted product object to a corresponding separate one of the plurality of display zones in the background display area and the generating the target page comprises:

determining, on the basis of acquired generation time information for the at least part of the order history records of the current user, a sequence of image information on corresponding product objects extracted from the information of the obtained at least the part of the order history records of the current user; and adding the product object image information in the determined sequence to each of the plurality of display zones of the background display area.

8. The method as described in claim 1, further comprising:

detecting a new order generation event of the current user;

in response to detecting the new order generation event, extracting newly extracted product object image information from a newly generated order associated with the new order generation event; and using the newly extracted product object image information to update the target image.

9. The method as described in claim 1, wherein the target page is a video target page, and wherein the target image includes image information of a video product object in the at least part of the order history records of the current user.

10. The method of claim 1, further comprising:

dynamically updating the background display area with one or more updated target images based at least in part on one or more orders placed or updated by the user since a the target image was caused to be displayed in the background display area.

11. The method of claim 1, wherein the determining of the target image comprises:

obtaining a product category associated with the target page;

obtaining the at least the part of the order history records of the current user, wherein the at least the part of order history records of the current user is associated with the product category; and obtaining the target image.

12. The method of claim 11, wherein the obtaining the target image comprises:

obtaining the target image based at least in part on the product category of the target page and at least the part of the order history records of the current user.

13. The method of claim 1, wherein the background display area and the foreground display area are associated with a product category, and wherein the product object is associated with the product category.

14. The method of claim 1, wherein the foreground display area is displayed as an overlay in relation to the background display area.

15. The method of claim 1, wherein the background display area is dynamically updated with one or more changes in a status of an order associated with the product object.

16. The method of claim 15, wherein the background display area is updated contemporaneously with the one or more changes in the status of the order associated with the product object.

17. The method of claim 1, wherein dynamically updating the background display area comprises updating the target image to be displayed in the background display area.

18. The method of claim 1, wherein the target image to be displayed in the background display area is displayed in the form of a link such that in response to selection of the target image detailed information associated with an order corresponding to the product object is displayed.

19. The method of claim 18, wherein the order corresponding to the product object is an order that is included in the order history of the current user.

20. The method of claim 1, wherein dynamically updating the background display area comprises:
    determining that the order history records of the user has changed since the target image was displayed in the background display area; and
    updating the background display area to comprise an image associated with the change to the order history records of the user.

21. A device comprising:
    at least one processor configured to:
        receive a request to display a target page, wherein the target page includes a background display area and a foreground display area;
        in response to receiving the request to display the target page:
            determine a target image to be displayed in the background display area, wherein the target image includes image information associated with a product object in at least part of order history records of a current user;
            cause the target image to be displayed in the background display area; and
            dynamically update the background display area based at least in part on a change to the order history records of the user; and
    a memory coupled to the one or more processors and configured to provide the one or more processors with instructions.

22. A device comprising:
    at least one processor configured to:
        receive a target image request from a client; and
        in response to receiving the target image from the client:
            determine the target image to be displayed in a background display area of a target page, wherein the target image includes target information of one or more product objects in at least part of one or more order history records of a current user;
            communicate the target image to the client for the client to display in relation to a target page, wherein the target page includes the background display area and a foreground display area, and wherein the target image is displayed in the background display area of the target page; and
            dynamically update the background display area based at least in part on a change to the order history records of the user.

23. A computer program product embodied in a tangible non-transitory computer-readable storage medium and comprising computer instructions for:
    receiving a request to display a target page, wherein the target page includes a background display area and a foreground display area; and
    in response to receiving the request to display the target image:
        determining a target image to be displayed in the background display area, wherein the target image includes image information associated with a product object in at least part of order history records of a current user;
        causing the target image to be displayed in the background display area and
        dynamically updating the background display area based at least in part on a change to the order history records of the user.

* * * * *